(12) United States Patent
Ohwa et al.

(10) Patent No.: US 8,923,654 B2
(45) Date of Patent: Dec. 30, 2014

(54) INFORMATION PROCESSING APPARATUS AND METHOD, AND STORAGE MEDIUM STORING PROGRAM FOR DISPLAYING IMAGES THAT ARE DIVIDED INTO GROUPS

(75) Inventors: Tsunayuki Ohwa, Kanagawa (JP); Satoshi Akagawa, Tokyo (JP)

(73) Assignee: Sony Corporation (JP)

( * ) Notice: Subject to any disclaimer, the term of this patent is extended or adjusted under 35 U.S.C. 154(b) by 1290 days.

(21) Appl. No.: 12/315,965

(22) Filed: Dec. 8, 2008

(65) Prior Publication Data

US 2009/0148071 A1 Jun. 11, 2009

(30) Foreign Application Priority Data

Dec. 11, 2007 (JP) ................ P2007-319210

(51) Int. Cl.
| | |
|---|---|
| G06K 9/60 | (2006.01) |
| G06K 9/62 | (2006.01) |
| G06F 17/30 | (2006.01) |
| G06F 7/00 | (2006.01) |
| G11B 27/10 | (2006.01) |
| H04N 5/76 | (2006.01) |
| H04N 9/82 | (2006.01) |
| H04N 5/775 | (2006.01) |

(52) U.S. Cl.
CPC ........... H04N 5/76 (2013.01); H04N 9/8205 (2013.01); G11B 27/105 (2013.01); H04N 9/8227 (2013.01); H04N 5/775 (2013.01)
USPC ........... 382/305; 382/224; 707/722; 707/736

(58) Field of Classification Search
None
See application file for complete search history.

(56) References Cited

U.S. PATENT DOCUMENTS

| | | | | |
|---|---|---|---|---|
| 5,796,428 A | * | 8/1998 | Matsumoto et al. | 348/207.99 |
| 6,430,566 B1 | * | 8/2002 | Shiiyama | 382/276 |
| 6,636,648 B2 | * | 10/2003 | Loui et al. | 382/284 |
| 2006/0173918 A1 | * | 8/2006 | Nakase et al. | 707/104.1 |
| 2007/0041668 A1 | * | 2/2007 | Todaka | 382/306 |
| 2008/0059526 A1 | * | 3/2008 | Murakoshi | 707/104.1 |
| 2009/0240688 A1 | * | 9/2009 | Ohwa et al. | 707/5 |
| 2011/0025873 A1 | * | 2/2011 | Wang et al. | 348/222.1 |

FOREIGN PATENT DOCUMENTS

| | | | |
|---|---|---|---|
| JP | 07-123307 | A | 5/1995 |
| JP | 10-143631 | A | 5/1998 |
| JP | 2004-227391 | A | 8/2004 |
| JP | 2004-355069 | A | 12/2004 |
| JP | 2006-285526 | A | 10/2006 |
| JP | 2006-332921 | A | 12/2006 |
| JP | 2007-206919 | A | 8/2007 |

* cited by examiner

*Primary Examiner* — Randolph I Chu
(74) *Attorney, Agent, or Firm* — Lerner, David, Littenberg, Krumholz & Mentlik, LLP

(57) ABSTRACT

An information processing apparatus displays, for each group, images that are divided into groups so that each group contains at least one of the images. The apparatus includes an image-data storing unit that stores image data of the images, a group-attribute-information storing unit that stores attribute information of the groups, a display controlling unit that controls processing for displaying the images for each group, a search-key extracting unit that extracts a search key when the display controlling unit issues an instruction for starting the processing for displaying the images for each group, and a searching unit that searches for the groups associated with the extracted search key. The display controlling unit controls display of a library of the groups so that the groups associated with the search key and found by the searching unit are displayed at a top side in the library.

12 Claims, 24 Drawing Sheets

| ID | TITLE | THE NUMBER OF PAGES | PERIOD OF TIME | STORED-PICTURE ID |
|----|-------|---------------------|----------------|-------------------|
| S1 | IZU TRIP | 10 | 8/15-17 | P1, P2, ... |

| ID | PHOTOGRAPH DATE AND TIME | COMMENT | FOCAL DISTANCE | FACE RECOGNITION DATA |
|----|--------------------------|---------|----------------|-----------------------|
| P1 | 8/15 11:15 | ON BEACH | ... | ××× |

FIG. 15

| ID | TITLE | THE NUMBER OF PAGES | PERIOD OF TIME | STORED-PICTURE ID | COMMENT | FACE RECOGNITION DATA |
|---|---|---|---|---|---|---|
| S1 | IZU TRIP | 10 | 8/15-17 | P1, P2, ... | ON BEACH, BBQ, ... | xxx |

FIG. 16

| ID | PHOTOGRAPH DATE AND TIME | COMMENT | SCRAPBOOK TITLE | PERIOD OF EVENT | CORRESPONDING PAGE | FOCAL DISTANCE | FACE RECOGNITION DATA |
|---|---|---|---|---|---|---|---|
| P1 | 8/15 11:15 | ON BEACH | IZU TRIP | 8/15-17 | 1 | ... | xxx |

INFORMATION PROCESSING APPARATUS AND METHOD, AND STORAGE MEDIUM STORING PROGRAM FOR DISPLAYING IMAGES THAT ARE DIVIDED INTO GROUPS

CROSS REFERENCES TO RELATED APPLICATIONS

The present application claims priority from Japanese Patent Application No. JP 2007-319210, filed in the Japanese Patent Office on Dec. 11, 2007, the entire content of which is incorporated herein by reference.

BACKGROUND OF THE INVENTION

1. Field of the Invention

The present invention relates to apparatuses, methods, and programs for processing information. In particular, the present invention relates to an information processing apparatus, an information processing method, and a program which categorize content on the basis of metadata and which can preferentially display categories in which a user is more likely to be interested.

2. Description of the Related Art

In equipment, such as HDDs (hard disk drives) and personal computers, content can be searched for using metadata attached to the content. In such a case, however, in general, a user has to initiate an action on the equipment as to which metadata is to be used to search for the content. Also, in general, the user has to eventually select one piece of content from a list showing search results.

When pictures taken with a traditional (silver halide) camera are to be stored in an album or albums, the pictures can be stored in corresponding albums or pages through classification according to, for example, events, photograph locations, and dates. In addition, receipts, pamphlets, tickets, and so on that are associated with the taken pictures can also be stored in conjunction with the pictures. Thus, during searching for pictures after a long period of time has passed, it is possible to easily find the pictures from the classified albums or pages by using the date and the name of the event as search keys.

For example, Japanese Unexamined Patent Application Publication No. 10-143631 discloses a technology in which images captured on a picture film are converted into electronic images, additional information such as photograph dates, locations, and so on are attached to the electronic images, and the resulting images are stored and managed as electronic data in association with the picture film.

SUMMARY OF THE INVENTION

In HDD recorders and personal computers, it is difficult to store content, such as pictures and moving images, in association with receipts, pamphlets, tickets, and so on, unlike the albums of pictures taken with a silver halide camera.

In addition, when the user desires to refer to the content, he or she generally has to initiate an action on the equipment as to which metadata is to be used to search for the content. Even when search results are displayed in a list, in generally, the user has to eventually select one piece of content from the search results. When the number of search results is small, the user may lose a chance of viewing/listening to other content, and when the number of search results is large, the user may feel it difficult to select one piece of content therefrom.

In view of such situations, it is desirable to categorize content on the basis of metadata and automatically and preferentially display categories in which a user is more likely to be interested.

According to a first embodiment of the present invention, there is provided an information processing apparatus that displays, for each group, images that are divided into groups so that each group contains at least one of the images. The information processing apparatus includes: an image-data storing unit configured to store image data of the images; a group-attribute-information storing unit configured to store attribute information of the groups; a display controlling unit configured to control processing for displaying the images for each group; a search-key extracting unit configured to extract a search key when the display controlling unit issues an instruction for starting the processing for displaying the images for each group; and a searching unit configured to search for the groups associated with the search key extracted by the search-key extracting unit, by using the group attribute information stored by the group-attribute-information storing unit. The display controlling unit controls display of a library of the groups so that the groups associated with the search key and found by the searching unit are displayed at a top side in the library.

The information processing apparatus can further include a date-and-time obtaining unit configured to obtain year, month, day, and time. When the display controlling unit issues the instruction for starting the processing for displaying the images for each group, the search-key extracting unit can extract, as the search key, at least one of the year, month, day, and time obtained by the date-and-time obtaining unit.

The information processing apparatus can further include a text-data obtaining unit configured to obtain text data externally through a network. When the display controlling unit issues the instruction for starting the processing for displaying the images for each group, the text-data obtaining unit can obtain the text data externally, and the search-key extracting unit extracts, as the search key, the text data obtained by the text-data obtaining unit.

The information processing apparatus can further include an EPG (electronic program guide) obtaining unit configured to obtain an EPG. When the display controlling unit issues the instruction for starting the processing for displaying the images for each group, the search-key extracting unit can extract the search key from information contained in the EPG obtained by the EPG obtaining unit in a predetermined period of time.

The information processing apparatus can further include a recording and/or reproducing unit configured to record and/or reproduce content data and an associated-information obtaining unit configured to obtain associated information attached to the content data. When the display controlling unit issues the instruction for starting the processing for displaying the images for each group, the search-key extracting unit can extract the search key from information contained in the associated information associated with the content data recorded or reproduced by the recording and/or reproducing unit in a predetermined period of time.

The searching unit can search for, from the group attribute information stored by the group-attribute-information storing unit, the groups associated with the search key extracted by the search-key extracting unit.

The image-data storing unit can further store attribute information of the images, and by using the image attribute information stored by the image-data storing unit, the searching unit can search for the images associated with the search key extracted by the search-key extracting unit and can search for the groups containing the found images on the basis of the group attribute information stored by the group-attribute-information storing unit.

According to the first embodiment of the present invention, there is provided an information processing method for an information processing apparatus that displays, for each group, images that are divided into groups so that each group contains at least one of the images. The method includes the steps of: storing image data of the images; storing attribute information of the groups; extracting a search key when an instruction for starting processing for displaying the images for each group is issued; searching for the groups associated with the extracted search key, by using the stored group attribute information; and controlling display of a library of the groups so that the found groups associated with the search key are displayed at a top side in the library.

According to the first embodiment of the present invention, there is provided a program for causing a computer to execute processing that uses a first storing unit for storing image data and a second storing unit for storing attribute information of groups into which images corresponding to the image data are classified so that each group contains at least one of the images and that displays the images for each group. The processing includes the steps of: extracting a search key when an instruction for starting processing for displaying the images for each group is issued; searching for the groups associated with the extracted search key, by using the group attribute information stored by the second storing unit; and controlling display of a library of the groups so that the found groups associated with the search key are displayed at a top side in the library.

According to the first embodiment of the present invention, the image data of images are stored and the attribute information of the groups of the images is stored. When the instruction for starting the processing for displaying the images for each group is issued, a search key is extracted, the groups associated with the extracted search key are searched for through the use of the stored group attribute information, and a list of the found groups are displayed so that the found groups associated with the search key are displayed at the top side in the list.

According to a second embodiment of the present invention, there is provided an information processing apparatus that displays, for each group, images that are divided into groups so that each group contains at least one of the images. The information processing apparatus includes: an image-data storing unit configured to store image data of the images; a group-attribute-information storing unit configured to store attribute information of the groups; a display controlling unit configured to control processing for displaying the images for each group; a search-key extracting unit configured to extract, when a user selects one of the groups displayed by the display controlling unit, the attribute information of the selected group as a search key from the group attribute information stored by the group-attribute-information storing unit; and a searching unit configured to search for the groups associated with the search key extracted by the search-key extracting unit, by using the group attribute information stored by the group-attribute-information storing unit. The display controlling unit controls display of a library of the groups associated with the search key and found by the searching unit.

The searching unit can search for, from the group attribute information stored by the group-attribute-information storing unit, the groups associated with the search key extracted by the search-key extracting unit.

The image-data storing unit can further store attribute information of the images, and by using the image attribute information stored by the image-data storing unit, the searching unit can search for the images associated with the search key extracted by the search-key extracting unit and can search for the groups containing the found images on the basis of the group attribute information stored by the group-attribute information storing unit.

According to the second embodiment of the present invention, there is provided an information processing method for an information processing apparatus that displays, for each group, images that are divided into groups so that each group contains at least one of the images. The method includes the steps of: storing image data of the images; storing attribute information of the groups; displaying the images for each group; extracting, when a user selects one of the displayed groups, the attribute information of the selected group as a search key, by using the stored group attribute information; searching for the groups associated with the extracted search key; and displaying a library of the found groups associated with the search key.

According to the second embodiment of the present invention, there is provided a program for causing a computer to execute processing that uses a first storing unit for storing image data and a second storing unit for storing attribute information of groups into which images corresponding to the image data are classified so that each group contains at least one of the images and that displays the images for each group. The processing includes the steps of: controlling display of the images for each group; extracting, when a user selects one of the displayed groups, the attribute information of the selected group as a search key, by using the group attribute information stored by the second storing unit; searching for the groups associated with the extracted search key; and controlling display of a library of the found groups associated with the search key.

According to the second embodiment of the present invention, the image data of images are stored, the attribute information of the groups of the images is stored, and the images are displayed for each group. When the user selects one of the displayed groups, the attribute information of the selected group is extracted as the search key through the use of the stored group attribute information, the groups associated with the extracted search key are searched for, and a list of the found groups associated with the search key is displayed.

The term "network" as used herein refers to a system in which at least two apparatuses are connected to allow information to be transmitted from one of the apparatuses to another. The apparatuses that communicate through the network may be independent from each other or may be internal blocks included one apparatus.

The term "communication" as used herein may include not only a wireless communication and a wired communication, but also a communication that involves both wireless communication and wired communication and a communication that involves wireless communication in one section and wired communication in another section. In addition, the communication may include a communication that involves wired communication from a first apparatus to a second apparatus and wireless communication from the second apparatus to the first apparatus.

The information processing apparatus may be an independent apparatus or may be a block that performs information processing for a recording/reproducing apparatus, such as a HDD recorder.

As described above, according to the first embodiment of the present invention, a library of groups can be displayed, and in particular, for example, when an application is started up, a list of groups in which a user is assumed to be interested can be preferentially displayed on the basis of the state during the startup.

According to the second embodiment of the present invention, a list of groups can be displayed, and in particular, groups associated with a group to which the user is currently viewing/listening can be searched for and a list of the found groups can be displayed.

BRIEF DESCRIPTION OF THE DRAWINGS

FIG. 15 is a table showing an example of metadata attached to the scrapbook;

FIG. 16 is a table showing an example of metadata attached to an image;

DESCRIPTION OF THE PREFERRED EMBODIMENT

An embodiment of the present invention will be described below with reference to the accompanying drawings.

Figure 1:
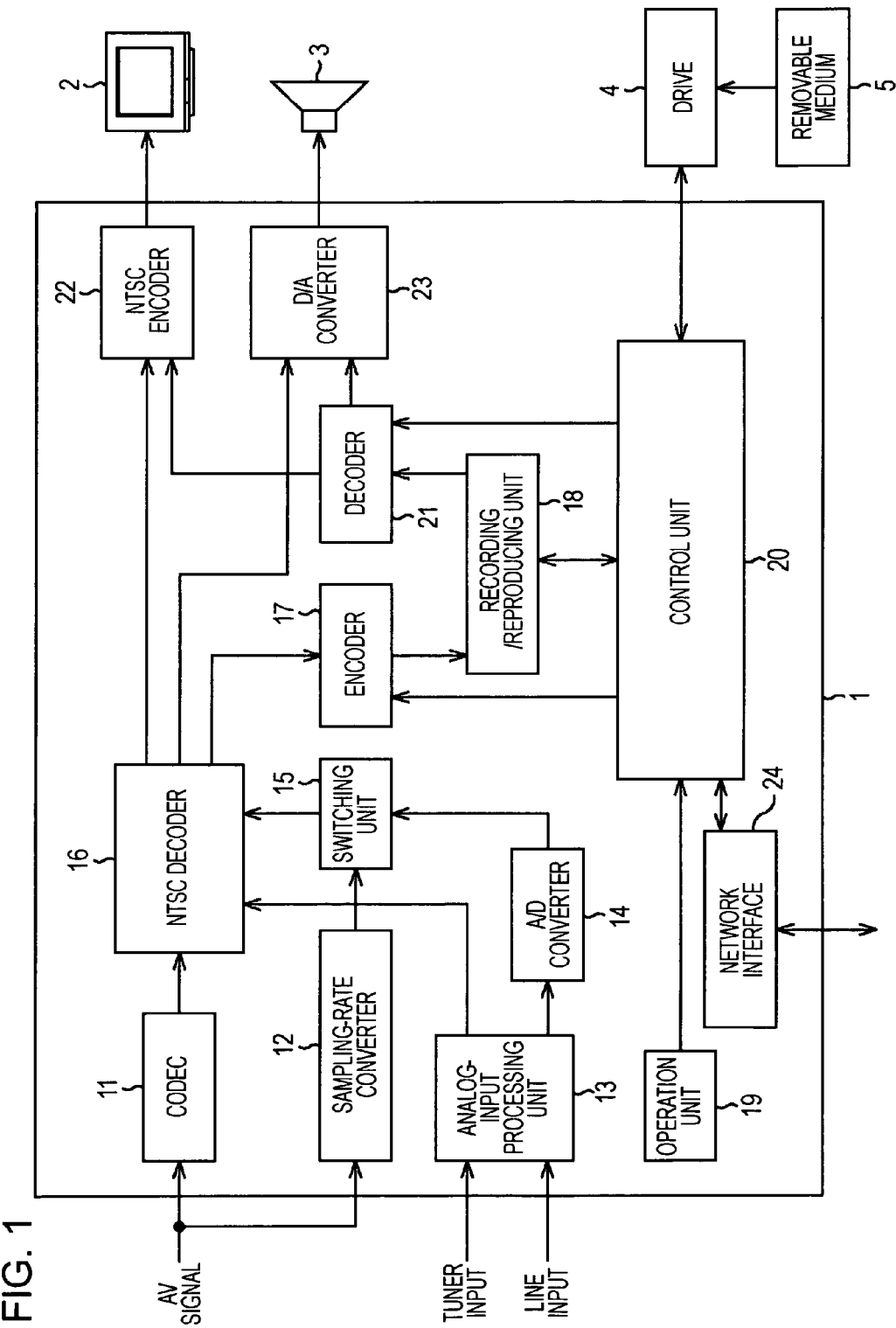
FIG. 1 is a block diagram showing an example of a HDD recorder according to one embodiment of the present invention.

FIG. 1 is a block diagram showing an example of the configuration of a HDD (hard disk drive) recorder according to one embodiment of the present invention.

A HDD recorder 1 shown in FIG. 1 records or reproduces AV (audio video) signals supplied from an external apparatus (not shown) or video signals and audio signal input as analog signals supplied from an analog tuner (not shown) or a line tuner (not shown). The HDD recorder 1 outputs the reproduced video signals to a monitor 2 that is externally connected. The HDD recorder 1 outputs the reproduced audio signals to a speaker 3 that is externally connected.

Examples of the external apparatus that supplies the AV signals include an external apparatus connected through i.LINK(trademark), a digital BS (broadcasting satellite) tuner, a digital CS (communications satellite) tuner, a digital camera, a digital still camera, and a scanner.

A drive 4 is connected to the HDD recorder 1, as appropriate. The drive 4 is configured such that a removable medium 5 is inserted thereinto, as appropriate, and writes/reads data to/from the removable medium 5. Examples of the removable medium 5 include a magnetic disk (including a flexible disk), an optical disk (including a CD-ROM [compact disk-read only memory], a DVD [digital versatile disc], and a magneto-optical disk), as well as a semiconductor memory.

The HDD recorder 1 shown in FIG. 1 includes a codec 11, a sampling-rate converter 12, an analog-input processing unit 13, an audio/digital (A/D) converter 14, a switching unit 15, an NTSC (national television system committee) decoder 16, an encoder 17, a recording/reproducing unit 18, an operation unit 19, a control unit 20, a decoder 21, an NTSC encoder 22, a digital/analog (D/A) converter 23, and a network interface 24.

The codec 11 decompresses digital video signals of the AV signals supplied from the external apparatus (not shown) and supplies the decompressed digital video signals to the NTSC decoder 16.

The sampling-rate converter 12 converts the sampling rate of digital audio signals of the AV signals supplied from the external apparatus (not shown) into a different sampling rate. The sampling-rate converter 12 supplies the resulting digital audio signals to the switching unit 15.

On the basis of a signal that is supplied from the control unit 20 and that is indicative of a user operation performed at the operation unit 19, the analog-input processing unit 13 selects either analog signals supplied from the analog tuner (not shown) or analog signals supplied from the line tuner (not shown). The analog-input processing unit 13 supplies analog video signals of the selected analog signals to the NTSC decoder 16. The analog-input processing unit 13 also supplies analog audio signals of the selected analog signals to the A/D converter 14.

The AND converter 14 performs A/D conversion to convert the analog audio signals, supplied from the analog-input processing unit 13, into digital audio signals. The A/D converter 14 supplies the digital audio signals to the switching unit 15.

On the basis of a signal that is supplied from the control unit 20 and that is indicative of a user operation performed at the operation unit 19, the switching unit 15 selects either digital audio signals supplied from the sampling-rate converter 12 or digital audio signals supplied from the A/D converter 14. The switching unit 15 supplies the selected digital audio signals to the NTSC decoder 16.

The NTSC decoder 16 converts the digital video signals, supplied from the codec 11, or the analog video signals, input from the analog-input processing unit 13, into digital video signals based on an NTSC system. The NTSC decoder 16 combines the converted NTSC-system digital video signals and the digital audio signals supplied from the switching unit 15.

For recording video signals and audio signals input to the HDD recorder 1, the NTSC decoder 16 supplies the combined digital AV signals to the encoder 17. On the other hand, for directly reproducing the video signals and the audio signals input to the HDD recorder 1 without recording the signals, the NTSC decoder 16 supplies the combined digital AV signals to the NTSC encoder 22 and the D/A converter 23.

The encoder 17 performs encoding processing, which complies with a predetermined system, such as an MPEG (moving picture experts group) system, on the digital AV signals supplied from the NTSC decoder 16 to obtain compressed and encoded signal data. The encoder 17 supplies the compressed and encoded signal data to the recording/reproducing unit 18.

The recording/reproducing unit 18 includes, for example, a hard disk or an optical disk. The recording/reproducing unit 18 records the signal data supplied from the encoder 17. The recording/reproducing unit 18 also supplies the recorded signal data to the decoder 21. That is, the recording/reproducing unit 18 reproduces the recorded signal data.

The operation unit 19 includes, for example, various operation buttons and/or keys or a touch panel. A user operates the operation unit 19 in order to input an instruction for the HDD recorder 1. In accordance with the user operation, the operation unit 19 supplies a signal indicating the user operation to the control unit 20.

The control unit 20 includes, for example, a microprocessor, and controls the entire HDD recorder 1 on the basis of a signal that is supplied from the operation unit 19 and that is indicative of a user operation.

The decoder 21 performs decoding processing, which complies with a system (e.g., an MPEG system) corresponding to the aforementioned system, on the signal data supplied from the recording/reproducing unit 18, to obtain decompressed and decoded digital AV signals. The decoder 21 supplies digital video signals of the decompressed and decoded digital AV signals to the NTSC encoder 22. The decoder 21 also supplies the digital audio signals of the decompressed and decoded digital AV signals to the D/A converter 23.

The NTSC encoder 22 converts the digital video signals, supplied from the decoder 21, into NTSC-system video signals. The NTSC encoder 22 supplies the converted video signals to the monitor 2.

The D/A converter 23 performs D/A conversion to convert the digital audio signals, supplied from the decoder 21, into analog audio signals. The D/A converter 23 supplies the analog audio signals to the speaker 3.

The network interface 24 is connected to a network, such as the Internet or a LAN (local area network), to transmit/receive information to/from, for example, external equipment and a server.

With this configuration, the HDD recorder 1 can record or reproduce input video signals and audio signals.

Figure 2:
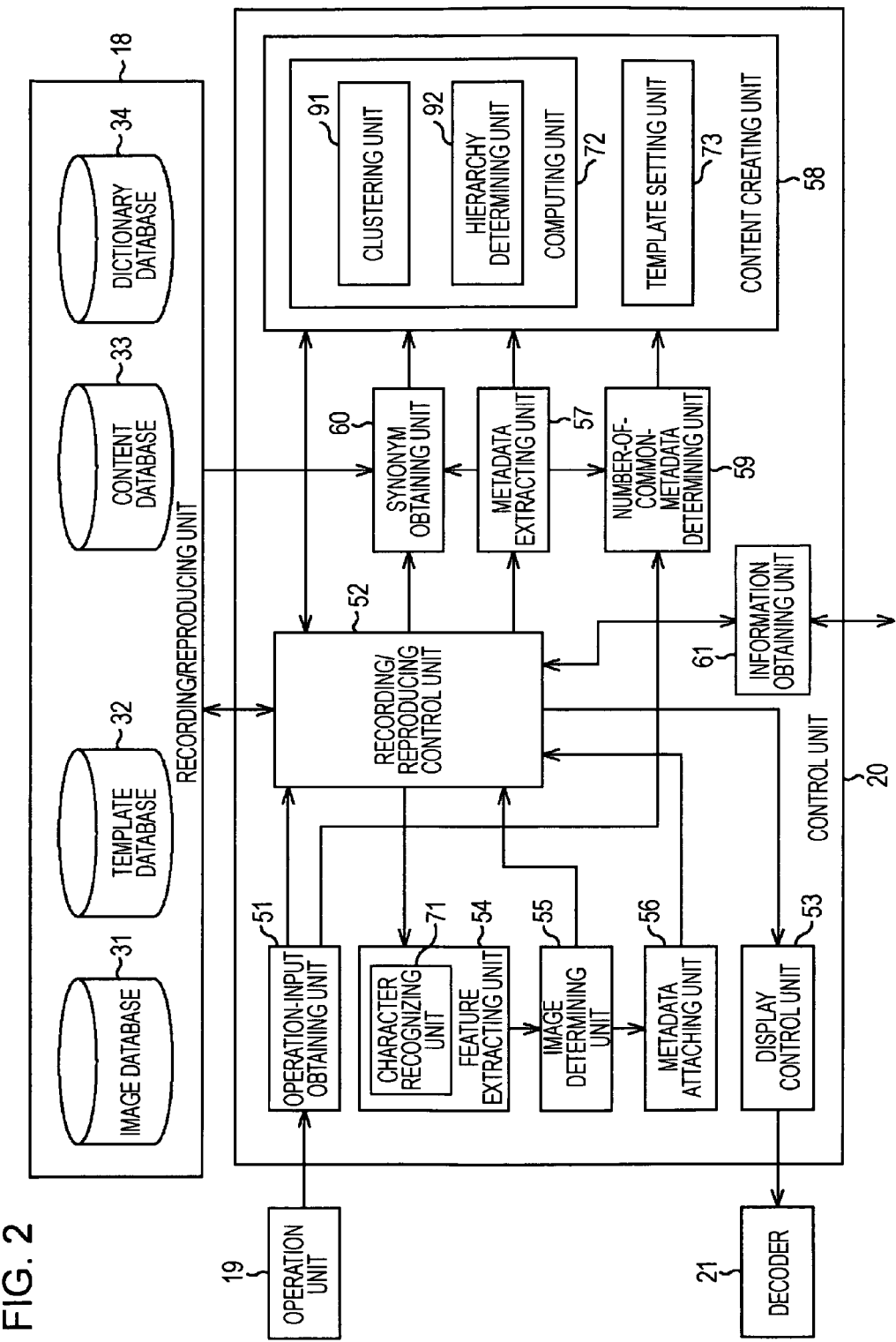
FIG. 2 is a block diagram showing an example of the configuration of a control unit in the HDD recorder.

FIG. 2 is a block diagram showing an example of the configuration of the recording/reproducing unit 18 and the control unit 20 in the HDD recorder 1 shown in FIG. 1.

The recording/reproducing unit 18 includes an image database 31, a template database 32, a content database 33, and a dictionary database 34.

In the image database 31, image data supplied from the encoder 17 shown in FIG. 1 and metadata indicating attributes of images are stored in association with each other.

In the template database 32, background templates, layout templates, and metadata indicating attributes of the background templates and the layout templates are recorded in association with each other. The background templates are data of background images that provide, when a scrapbook is displayed, backgrounds of images arranged in the scrapbook. The scrapbook is content recorded in the content database 33. The layout templates are information for setting layouts of the images in the scrapbook.

In the content database 33, data of scrapbooks, which are content in which images divided into groups on the basis of the metadata are arranged for each group, are stored in association with the metadata of the scrapbooks. Details of the content are described below.

In the dictionary database 34, data of various dictionaries, such as a Japanese dictionary, an English-Japanese dictionary, a Japanese-English dictionary, and a thesaurus are recorded as words.

The control unit 20 includes an operation-input obtaining unit 51, a recording/reproducing control unit 52, a display control unit 53, a feature extracting unit 54, an image determining unit 55, a metadata attaching unit 56, a metadata extracting unit 57, a content creating unit 58, a number-of-common-metadata determining unit 59, a synonym obtaining unit 60, and an information obtaining unit 61.

On the basis of a signal that is supplied from the operation unit 19 and that is indicative of a user operation, the operation-input obtaining unit 51 supplies information indicating the description of the user operation to the recording/reproducing control unit 52.

More specifically, for example, on the basis of a signal that is supplied from the operation unit 19 and that is indicative of a user operation for selecting an image, a background template, or a scrapbook to be displayed on the monitor 2, the operation-input obtaining unit 51 supplies information indicating the image, background template, or content selected by the user to the recording/reproducing control unit 52.

Also, on the basis of a signal that is supplied from the operation unit 19 and that is indicative of a user operation for selecting a predetermined folder in which images are stored, the operation-input obtaining unit 51 supplies information indicating the predetermined folder selected by the user to the recording/reproducing control unit 52.

On the basis of a signal that is supplied from the operation unit 19 and that is indicative of a user operation, the operation-input obtaining unit 51 selects predetermined image data from image data of images read by the recording/reproducing control unit 52.

On the basis of a signal that is supplied from the operation unit 19 and that is indicative of a user operation for setting a threshold for determining the number of images to which the same metadata is attached, the operation-input obtaining unit 51 supplies information indicating the threshold set by the user to the number-of-common-metadata determining unit 59.

The recording/reproducing control unit 52 controls recording or reproduction performed by the recording/reproducing unit 18. The recording/reproducing control unit 52 reads data of image data, a background template, a layout template, or a scrapbook from the recording/reproducing unit 18.

On the basis of information that is supplied from the operation-input obtaining unit 51 and that is indicative of a predetermined folder selected by the user, the recording/reproducing control unit 52 reads image data stored in the predetermined folder.

The recording/reproducing control unit 52 supplies the read image data to the feature extracting unit 54. The recording/reproducing control unit 52 causes newly read image data to which metadata supplied from the metadata attaching unit 56 is attached to be recorded in the recording/reproducing unit 18.

The recording/reproducing control unit 52 also supplies the data of the read image data, background template, layout template, or scrapbook to the content creating unit 58.

The display control unit 53 controls decoding processing of the decoder 21, on the basis of the data of the image data, background template, layout template, or scrapbook read by the recording/reproducing control unit 52.

The feature extracting unit 54 extracts features of an image in the image data supplied from the recording/reproducing control unit 52. More specifically, the feature extracting unit 54 extracts features of edges and plain portions in an image in the image data supplied from the recording/reproducing control unit 52 or extracts feature points and the amount of features for performing face recognition processing. Any methods may be used as a method for extracting the feature points and the amount of features for the face recognition processing and a method for the face recognition processing. The feature extracting unit 54 extracts an area of a character string contained in the image in the image data supplied from the recording/reproducing control unit 52.

The feature extracting unit 54 has a character recognizing unit 71. The character recognizing unit 71 recognizes characters in the extracted character-string area.

The feature extracting unit 54 supplies, to the image determining unit 55, the amount of extracted features in the edges and plain portions in the image and the recognized characters in the character string.

On the basis of the amount of features supplied from the feature extracting unit 54 and the recognized characters in the character string, the image determining unit 55 determines whether or not the image read by the recording/reproducing control unit 52 is an image of the face of a certificate, note, stamp, ticket, coupon, or the like on which a character string is shown. Upon determining that the image read by the recording/reproducing control unit 52 is an image of the face of a certificate, note, stamp, ticket, coupon, or the like, the image determining unit 55 obtains character-string data on the basis of the recognized characters in the character string.

The image determining unit 55 executes face recognition processing on the basis of the feature points and the amount of features supplied from the feature extracting unit 54.

The image determining unit 55 supplies the obtained character-string data and a result of the face recognition processing to the metadata attaching unit 56.

The metadata attaching unit 56 supplies the character-string data as metadata, the character-string data being supplied from the image determining unit 55, to the recording/reproducing control unit 52. More specifically, the metadata attaching unit 56 attaches the character-string data as metadata, the character-string data being supplied from the image determining unit 55, to the image data newly read by the recording/reproducing control unit 52.

The metadata extracting unit 57 extracts the metadata attached to the image data read by the recording/reproducing control unit 52. The metadata extracting unit 57 supplies the extracted metadata to the content creating unit 58.

The metadata extracting unit 57 also determines whether or not common metadata exists in the extracted metadata. Upon determining that common metadata exists, the metadata extracting unit 57 determines the number of pieces of common metadata, i.e., the number of images to which the same metadata is attached, and supplies the determined number of pieces of common metadata to the number-of-common-metadata determining unit 59. The metadata extracting unit 57 supplies the common metadata to the content creating unit 58.

The content creating unit 58 creates a scrapbook, which is content in which multiple images read by the recording/reproducing control unit 52 on the basis of the metadata supplied from the metadata extracting unit 57 or synonyms supplied from the synonym obtaining unit 60 (described below) and divided into groups according to the metadata or the synonyms are arranged for each group. The content creating unit 58 includes a computing unit 72 and a template setting unit 73.

On the basis of the metadata supplied from the metadata extracting unit 57 or the synonyms supplied from the synonym obtaining unit 60, the computing unit 72 divides multiples images into groups according to the metadata or the synonyms. The computing unit 72 includes a clustering unit 91 and a hierarchy determining unit 92.

On the basis of the metadata supplied from the metadata extracting unit 57 or the synonyms supplied from the synonym obtaining unit 60, the clustering unit 91 clusters the images.

On the basis of the metadata supplied from the metadata extracting unit 57 or the synonyms supplied from the synonym obtaining unit 60, the hierarchy determining unit 92 determines a cluster hierarchy, which is a result of the clustering performed by the clustering unit 91.

Processing performed by the computing unit 72 to divide images into groups on the basis of the metadata will now be described with reference to FIGS. 3 and 4.

Figure 3:
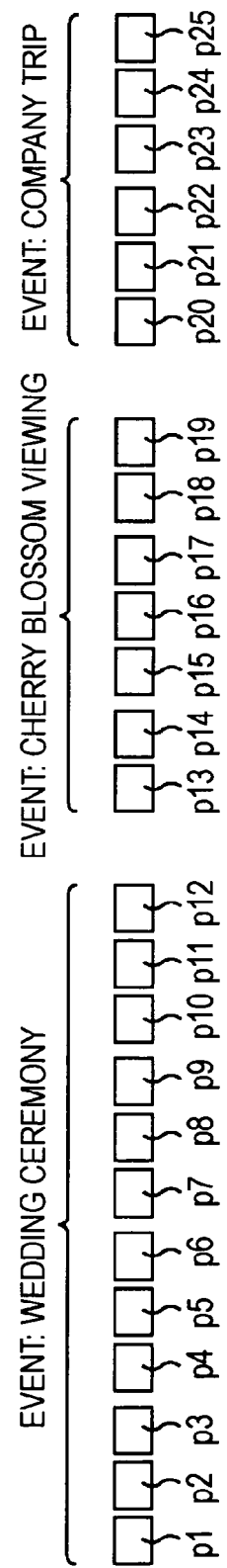
FIG. 3 shows an example of clusters of images.

FIG. 3 is a diagram showing an example of groups (clusters) of images.

In FIG. 3, images p1 to p25 represent images recorded in the image database 31 in the recording/reproducing unit 18. Each rectangle in FIG. 3 represents one image. Corresponding metadata are attached to the images p1 to p25.

In the example shown in FIG. 3, "Wedding Ceremony" is attached to the images p1 to p12 as metadata indicative of an event. "Cherry Blossom Viewing" is attached to the images p13 to p19 as metadata indicative of an event. "Company Trip" is attached to the images p20 to p25 as metadata indicative of an event.

The clustering unit 91 clusters the images p1 to p25, on the basis of the event-indicative metadata attached to the images p1 to p25.

More specifically, as shown in FIG. 3, the clustering unit 91 generates a cluster including the images p1 to p12, a cluster including the images p13 to p19, and a cluster including the images p20 to p25.

Figure 4:
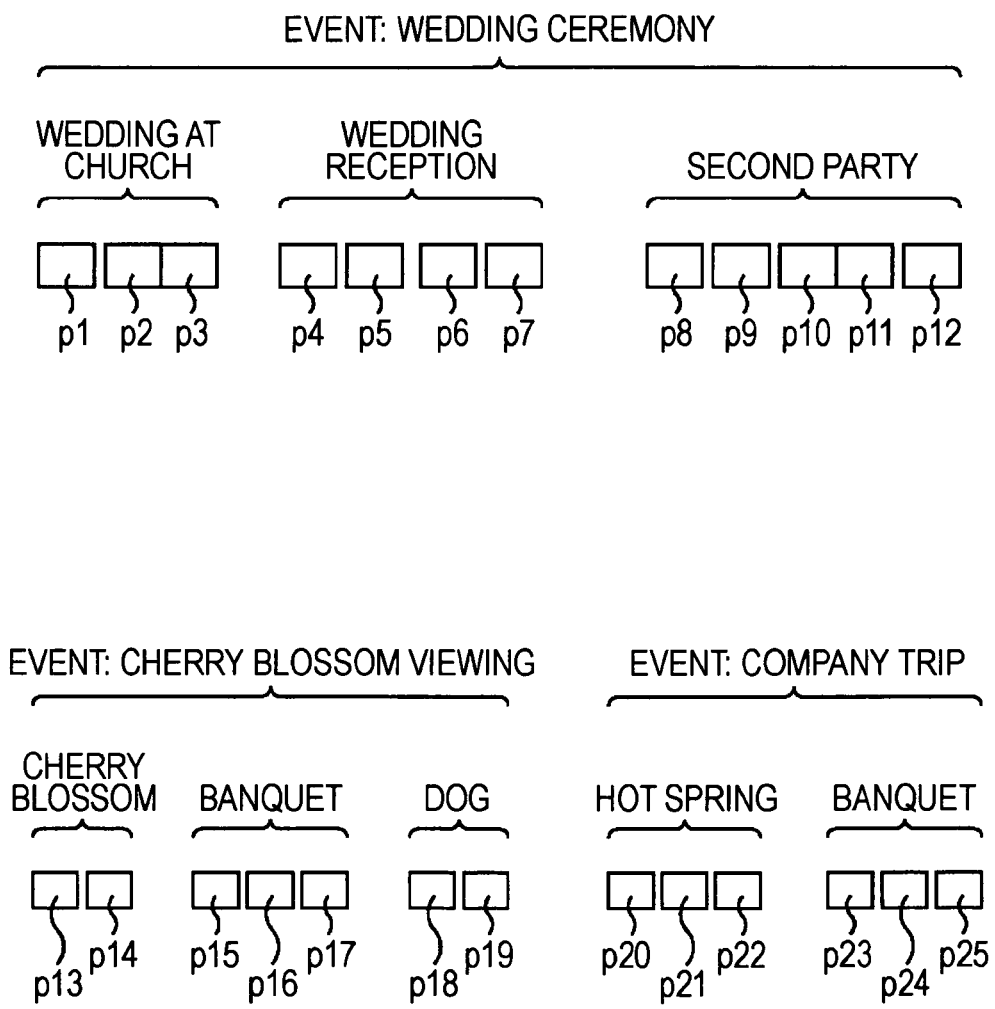
FIG. 4 shows an example in which the clusters of images are further clustered.

FIG. 4 is a diagram showing an example in which the groups (clusters) of images shown in FIG. 3 are further clustered.

Each of the images p1 to p25 has other metadata in addition to the metadata indicative of the event "wedding ceremony", "cherry blossom viewing", or "company trip". More specifically, each of the images p1 to p25 has any of metadata indicative of "wedding at church", "wedding reception", "second party", "cherry blossom", "banquet", "dog", and "hot spring", which are sub-events or low-order events in the aforementioned events.

The clustering unit 91 clusters the images p1 to p25, on the basis of the event-indicative metadata attached to the images p1 to p25. The hierarchy determining unit 92 determines a cluster hierarchy, which is a result of the clustering performed by the clustering unit 91, on the basis of the metadata indicative of the events "wedding ceremony", "cherry-blossom viewing", and "company trip" and the metadata indicative of the sub-events "wedding at church", "wedding reception", "second party", "cherry blossom", "banquet", "dog", and "hot spring".

More specifically, as shown in FIG. 4, the clustering unit 91 and the hierarchy determining unit 92 generate a cluster including the images p1 to p3, a cluster including the images p4 to p7, a cluster including the images p8 to p12, a cluster including the images p13 and p14, a cluster including the images p15 to p17, a cluster including the images p18 and p19, a cluster including the images p20 to p22, and a cluster including the images p23 to p25.

The clusters generated described above constitute pages of a scrapbook created.

Referring back to FIG. 2, the template setting unit 73 causes the recording/reproducing control unit 52 to read a background template and a layout template from the recording/reproducing unit 18, in accordance with the metadata supplied from the metadata extracting unit 57 or the synonyms supplied from the synonym obtaining unit 60. The template setting unit 73 sets the read background template and layout template for the generated cluster.

The content creating unit 58 causes the scrapbook, in which the images divided into groups according to the metadata or the synonyms are arranged for each group and for which the background template and the layout template are set, to be recorded in the content database 33 in the recording/reproducing unit 18 via the recording/reproducing control unit 52.

The number-of-common-metadata determining unit 59 determines whether or not the number of images to which the same metadata is attached, the images being supplied from the metadata extracting unit 57, is greater than or equal to a predetermined threshold obtained from the operation-input obtaining unit 51. Upon determining that the number of images to which the same metadata is attached is greater than or equal to the predetermined threshold, the number-of-common-metadata determining unit 59 supplies, to the content creating unit 58, information indicating that the number of images to which the same metadata is attached is greater than or equal to the predetermined threshold.

For each image to which the metadata is attached, the synonym obtaining unit 60 obtains synonyms of the metadata. More specifically, the synonym obtaining unit 60 obtains, from the dictionary database 34 in the recording/reproducing unit 18, synonyms of the metadata attached to the image data read by the recording/reproducing control unit 52. The synonym obtaining unit 60 supplies the obtained synonyms to the content creating unit 58.

Upon power on or upon start of an application, the information obtaining unit 61 obtains time information from an internal timer, and extracts and obtains a keyword that seems to be currently popular, for example, from top rakings of search keywords on a search engine on the Internet and/or the contents of descriptions of top pages (which are the so-called portal sites) via the network interface 24.

When the HDD recorder 1 is configured to have a user login function and to allow for pre-registration of user information, the information obtaining unit 61 can also extract and obtain a keyword that seems to match a logged-in user's preference from registration information of the user.

In addition, when the HDD recorder 1 is configured to be able to obtain an EPG (electronic program guide) together with AV (audio video) signals supplied from the external apparatus (not shown) or analog signals supplied from the analog tuner (not shown) or the line tuner (not shown), the information obtaining unit 61 can extract and obtain a keyword that seems to be currently popular, on the basis of keywords contained in an EPG obtained in a predetermined period of time, for example, one week or one month. In addition, the information obtaining unit 61 can also extract and obtain a keyword that seems to match the user's preference, for example, on the basis of keywords contained in an EPG of program data recorded/reproduced by the HDD recorder 1 in a predetermined period of time, such as one week or one month.

Metadata addition processing performed by the HDD recorder 1 will be described next.

For example, when an image is recorded to a predetermined folder in the recording/reproducing unit 18, the control unit 20 in the HDD recorder 1 starts the processing.

Figure 5:
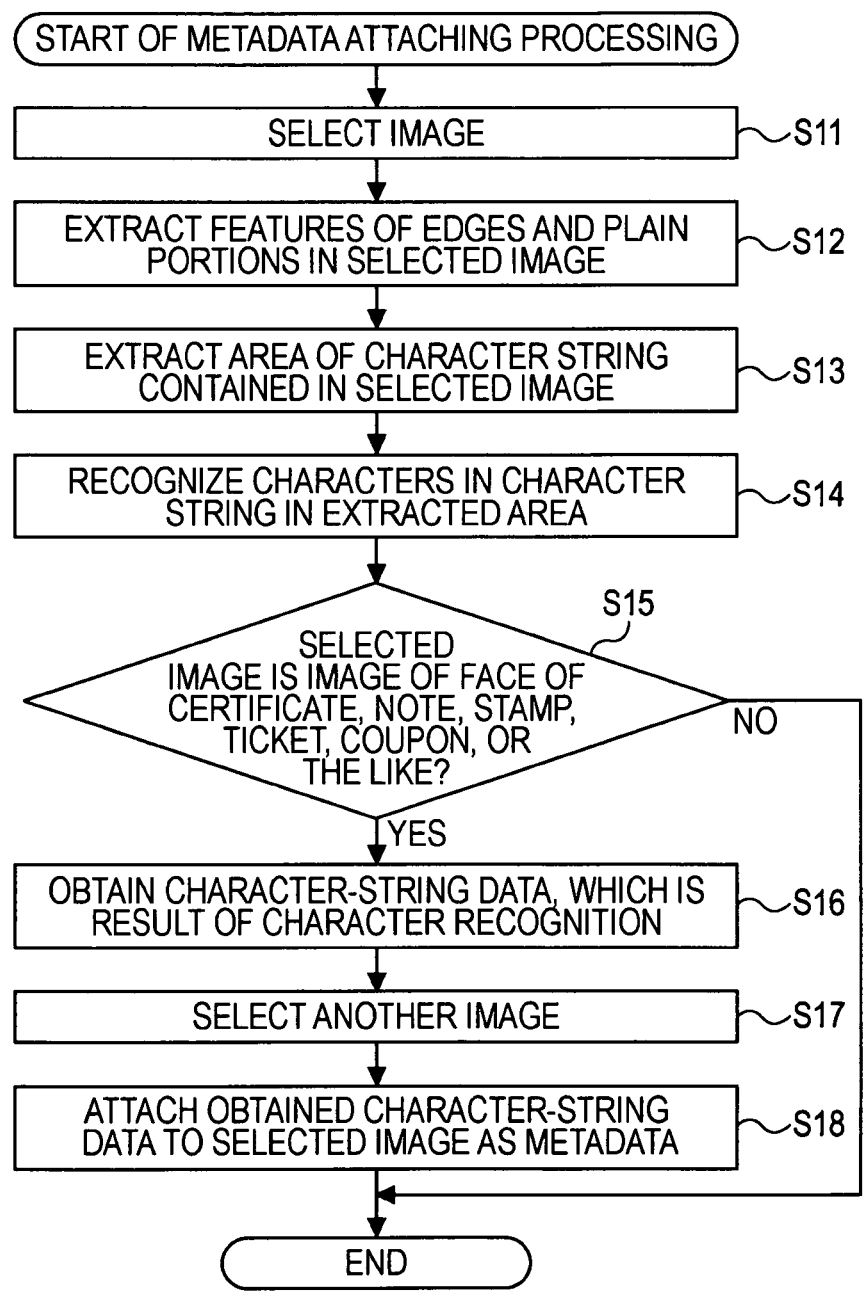
FIG. 5 is a flowchart illustrating an example of metadata attaching processing.

FIG. 5 is a flowchart showing an example of the metadata addition processing performed by the HDD recorder 1.

In step S11, the recording/reproducing control unit 52 reads image data of images recorded in the predetermined folder in the recording/reproducing unit 18. The operation-input obtaining unit 51 selects predetermined image data from the image data read by the recording/reproducing control unit 52. The recording/reproducing control unit 52 supplies the selected image data to the feature extracting unit 54.

In step S12, the feature extracting unit 54 extracts features of edges and plain portions in the image in the image data supplied from the recording/reproducing control unit 52. The feature extracting unit 54 can extract features of repeated patterns in the image in the image data and also can extract features, such as a dynamic range and an activity, in the image. That is, the feature extracting unit 54 also extracts image features that can be used for distinguishing between a case in which the image is an image of the face of a certificate, note, stamp, ticket, coupon, or the like and a case in which the image is an image of a person and/or a landscape.

In step S13, the feature extracting unit 54 extracts an area of a character string contained in the image in the image data supplied from the recording/reproducing control unit 52. For example, the feature extracting unit 54 extracts an area of a character string, on the basis of the positions of the edges extracted in step S12, a topology of areas surrounded by the detected edges, and so on.

In step S14, the character recognizing unit 71 in the feature extracting unit 54 recognizes characters in the character string contained in the image in the extracted area. The feature extracting unit 54 supplies, to the image determining unit 55, the amount of features in the edges, plain portions, and so on in the extracted image and the recognized characters in the character string.

In step S15, on the basis of the amount of features and the recognized characters, the amount and characters being supplied from the feature extracting unit 54, the image determining unit 55 determines whether or not the image read by the recording/reproducing control unit 52 is an image of the face of a certificate, note, stamp, ticket, coupon, or the like on which a character string is shown. That is, the image determining unit 55 determines whether the selected image is an image of the face of a certificate, note, stamp, ticket, coupon, or the like or an image of a person and/or a landscape. For example, when 20 or more characters having substantially the same size are contained in the image, or when 10 or more characters having substantially the same size are contained in the image, the edges of the characters account for 80% or more of all edges in the image, and the plain portions account for 60% or more in the image, the image determining unit 55 determines that the image is an image of the face of a certificate, note, stamp, ticket, coupon, or the like.

When it is determined in step S15 that the image read by the recording/reproducing control unit 52 is an image of the face of a certificate, note, stamp, ticket, coupon, or the like on which a character string is shown, the process proceeds to step S16.

In step S16, the image determining unit 55 obtains character-string data, on the basis of the recognized character string. The image determining unit 55 supplies the obtained character-string data to the metadata attaching unit 56.

In step S17, the operation-input obtaining unit 51 selects other image data from the image data read by the recording/reproducing control unit 52.

In step S18, the metadata attaching unit 56 supplies the character-string data as metadata, the character-string data being supplied from the image determining unit 55, to the recording/reproducing control unit 52. More specifically, the metadata attaching unit 56 attaches the character-string data as metadata, the character-string data being supplied from the image determining unit 55, to the image data of another image newly selected by the operation-input obtaining unit 51 and read by the recording/reproducing control unit 52. The processing then ends.

On the other hand, when it is determined in step S15 that the image read by the recording/reproducing control unit 52 is not an image of the face of a certificate, note, stamp, ticket, coupon, or the like on which a character string is shown, the processing ends.

Alternatively, the process may return to step S11 in which a next image is selected from the read images, and the above-described processing may be sequentially performed on all of the read images.

As described above, the HDD recorder 1 can add, as metadata, the character-string data of a character string in the image of the face of a certificate, note, stamp, ticket, coupon, or the like to another image.

Scrapbook creation processing performed by the HDD recorder 1 will be described next.

For example, when the operation unit 19 is operated and the control unit 20 in the HDD recorder 1 obtains an instruction for scrapbook creation processing, the control unit 20 starts the processing.

Figure 6:
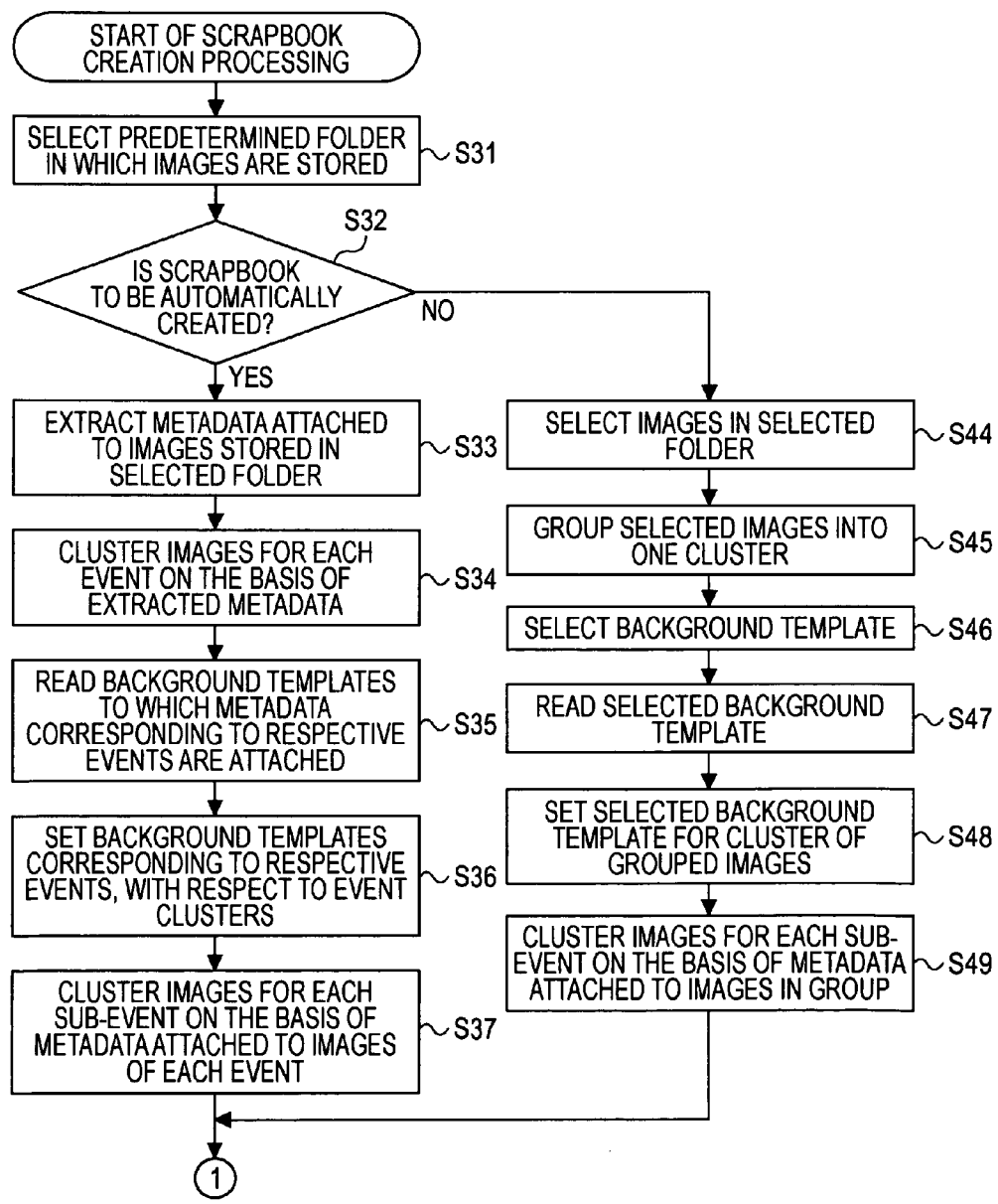
FIG. 6 is a flowchart illustrating an example of scrapbook creation processing.
Figure 7:
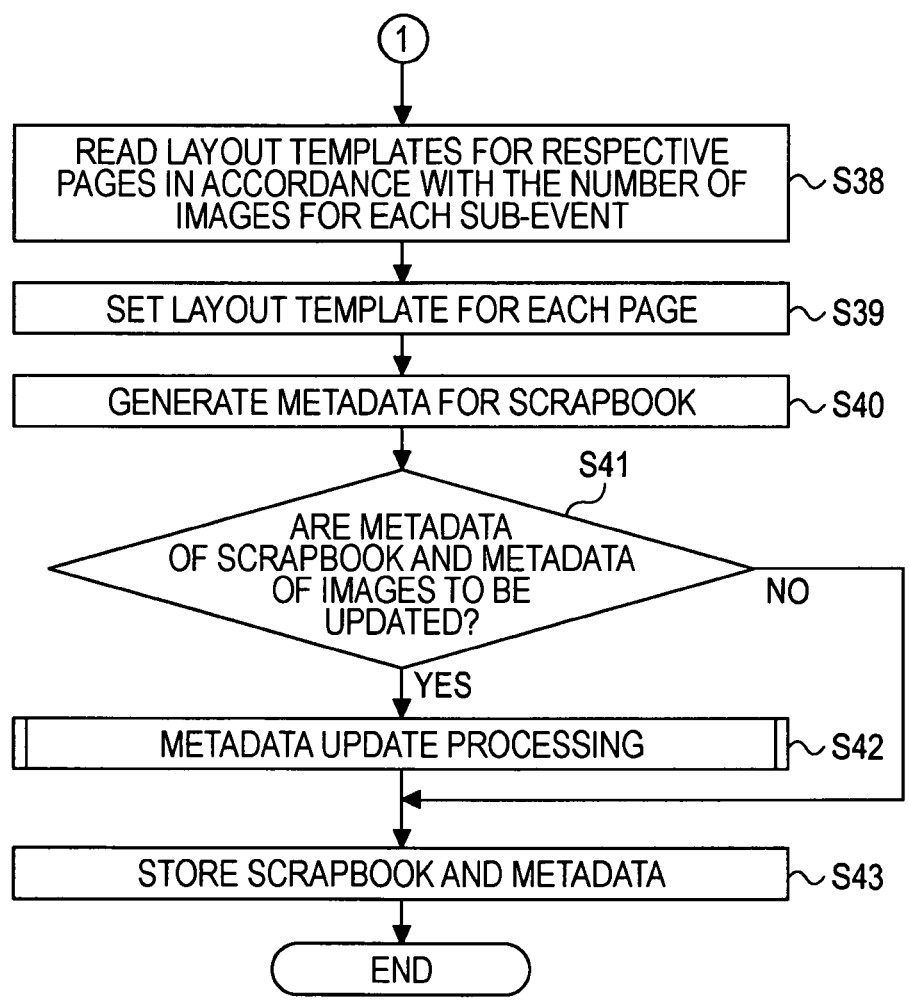
FIG. 7 is a flowchart illustrating an example of the scrapbook creation processing.

FIGS. 6 and 7 are flowcharts showing an example of the scrapbook creation processing performed by the HDD recorder 1.

In step S31, on the basis of a signal that is supplied from the operation unit 19 and that is indicative of a user operation for selecting a predetermined folder in which images are stored, the operation-input obtaining unit 51 supplies information indicating the predetermined folder selected by the user to the recording/reproducing control unit 52. On the basis of the information that is supplied from the operation-input obtaining unit 51 and that is indicative of the predetermined folder selected by the user, the recording/reproducing control unit 52 reads image data stored in the predetermined folder. The recording/reproducing control unit 52 supplies the read image data to the feature extracting unit 57 and the content creating unit 58.

In step S32, the content creating unit 58 determines whether or not a scrapbook is to be atomically created. More specifically, the content creating unit 58 determines whether or not a scrapbook is to be automatically created, on the basis of a signal that is supplied from the operation unit 19 and that is indicative of a user operation (e.g., a click on an automatic creation button) for selecting whether or not a scrapbook is to be created.

When it is determined in step S32 that a scrapbook is to be automatically created, the process proceeds to step S33.

In step S33, the metadata extracting unit 57 extracts metadata attached to the image data stored in the predetermined folder read by the recording/reproducing control unit 52. The metadata extracting unit 57 supplies the extracted metadata to the content creating unit 58.

In step S34, the computing unit 72 in the content creating unit 58 clusters the images for each event, on the basis of the extracted metadata. That is, the clustering unit 91 divides the images into groups, on the basis of the event-indicative metadata attached to the image data stored in the predetermined folder.

In step S35, the template setting unit 73 in the content creating unit 58 reads background templates to which the clustered metadata corresponding to the respective events are attached. That is, the template setting unit 73 causes the recording/reproducing control unit 52 to read background templates from the recording/reproducing unit 18, in accordance with the metadata supplied from the metadata extracting unit 57.

In step S36, with respect to the clustered event clusters, the template setting unit 73 sets the read background templates, that is, the background templates to which the metadata corresponding to the respective events are attached.

Figure 8:
FIG. 8 shows an example of background templates.

FIG. 8 is a schematic view showing an example of the configuration of the background templates. Background templates 111-1 to 111-3 shown in FIG. 8 have metadata, respectively. The template setting unit 73 sets the background templates having metadata corresponding to the metadata attached to the image data for generation of event clusters, which are clusters for respective events.

In step S37, the computing unit 72 clusters the images for each sub-event, on the basis of the metadata attached to the images of each event. That is, on the basis of the metadata, the computing unit 72 divides the images into groups for respective sub-events to divide the images into pages for the respective sub-events.

In step S38, the template setting unit 73 reads layout templates for the respective pages, in accordance with the number of images clustered for each sub-event.

In step S39, with respect to each page, the template setting unit 73 sets the read layout template for each of the pages.

Figure 9:
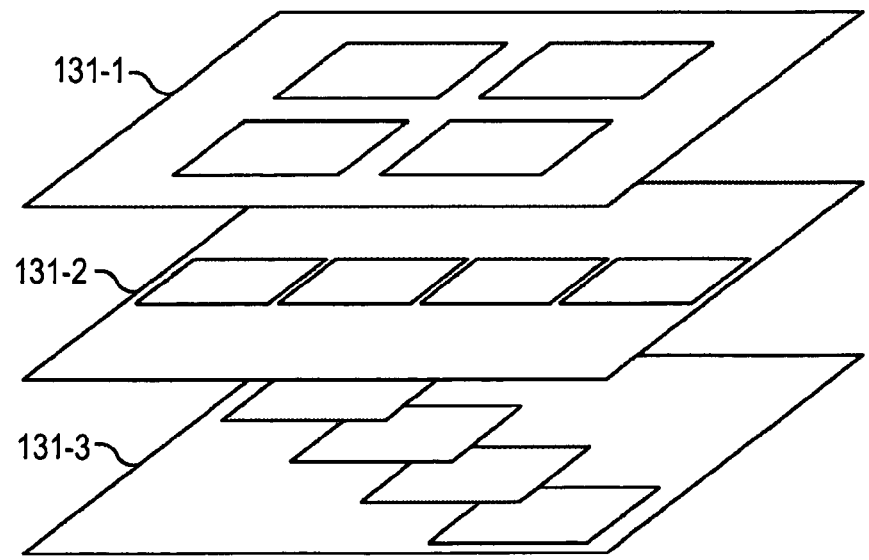
FIG. 9 shows an example of layout templates.

FIG. 9 is a schematic view showing an example of the configuration of the layout templates. Layout templates 131-1 to 131-3 shown in FIG. 9 have metadata, respectively. The template setting unit 73 sets the layout templates corresponding to the metadata attached to the image data for generation of sub-event clusters, which are clusters for the respective sub-events, and corresponding to the number of images in the respective pages of the sub-events.

Figure 10:
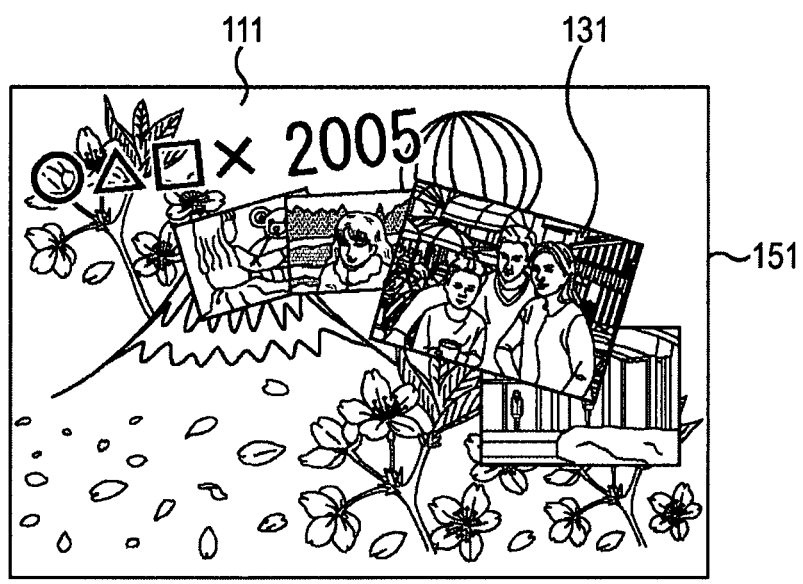
FIG. 10 shows an example of the configuration of a predetermined page of a scrapbook.

FIG. 10 shows an example of the configuration of a predetermined page of a scrapbook created.

In the example shown in FIG. 10, a background template 111 and a layout template 131 are set for a page 151. The background template 111 has the same metadata as the metadata of four images arranged in the page 151. On the basis of the layout template 131, for example, the layout of the four images is determined. The page 151 also shows a comment "○△□×2005". By operating the operation unit 19, the user can set an arbitrary comment at arbitrary position in the page 151.

In step S40, the content creating unit 58 generates metadata for the scrapbook.

Figures 12, 13, 14:
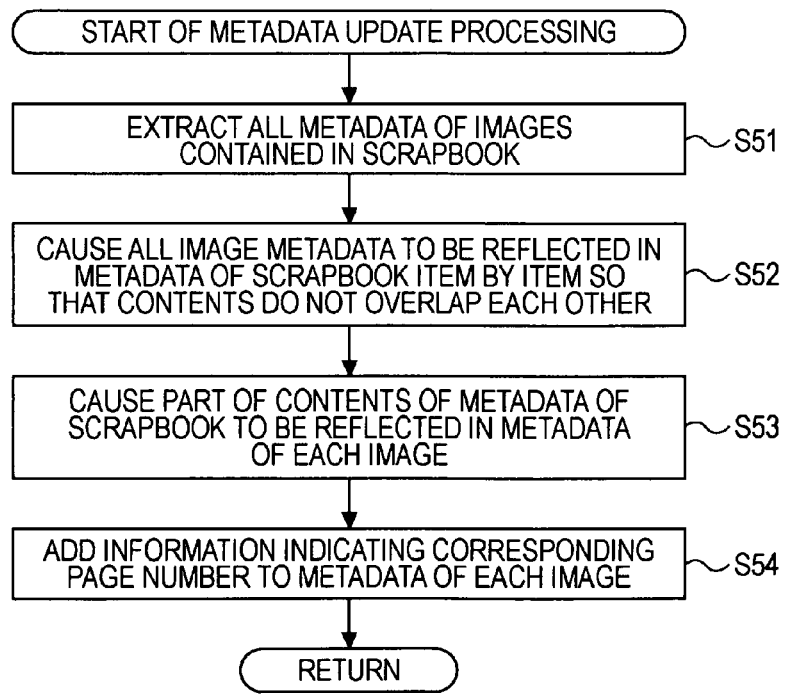
FIG. 12 is a table showing an example of metadata attached to the scrapbook.
FIG. 13 is a table showing an example of metadata attached to an image.
FIG. 14 is a flowchart illustrating an example of metadata update processing.

FIG. 12 is a table showing one example of metadata attached to the scrapbook. FIG. 13 is a table showing one example of metadata attached to an image.

Items of the metadata attached to the scrapbook may be predetermined. The items may include an item that is automatically determined, an item that is automatically obtained from the metadata of an image in the scrapbook, and/or an item that is determined on the basis of a user input. For example, the ID may be automatically determined in the order in which scrapbooks are created, the title may be determined on the basis of a user input or may be automatically determined through character recognition, the number of pages is automatically determined as a result of the clustering, and the period of time and the stored-picture IDs are automatically obtained from the metadata of the images in the scrapbook. Processing in which the metadata for the scrapbook are automatically attached through character recognition is described below with reference to a flowchart shown in FIG. 20.

The metadata attached to the image include, for example, information at the time of photographing, such as an ID, photograph date and time, a comment, and a focal distance, as well as face recognition data. The comment may be input by the user, or may be obtained by recognition of a character string, contained in the image, through the processing described above with reference to FIG. 5.

In step S41, the content creating unit 58 determines whether or not the metadata of the scrapbook and the metadata of the images are to be updated.

When it is determined in step S41 that the metadata of the scrapbook and the metadata of the images are to be updated, metadata update processing, which is described below with reference to FIG. 14, is executed in step S42.

When it is determined in step S41 that the metadata of the scrapbook and the metadata of the images are not to be updated or after the processing in step S42 is completed, the process proceeds to step S43. In step S43, the content creating unit 58 supplies the scrapbook, in which the images divided into groups on the basis of the metadata are arranged for each group and for which a background template and layout templates are set, to the content database 33 in the recording/reproducing unit 18 via the recording/reproducing control unit 52 and causes the scrapbook to be recorded to the content database 33, thereby completing the processing.

Figure 11:
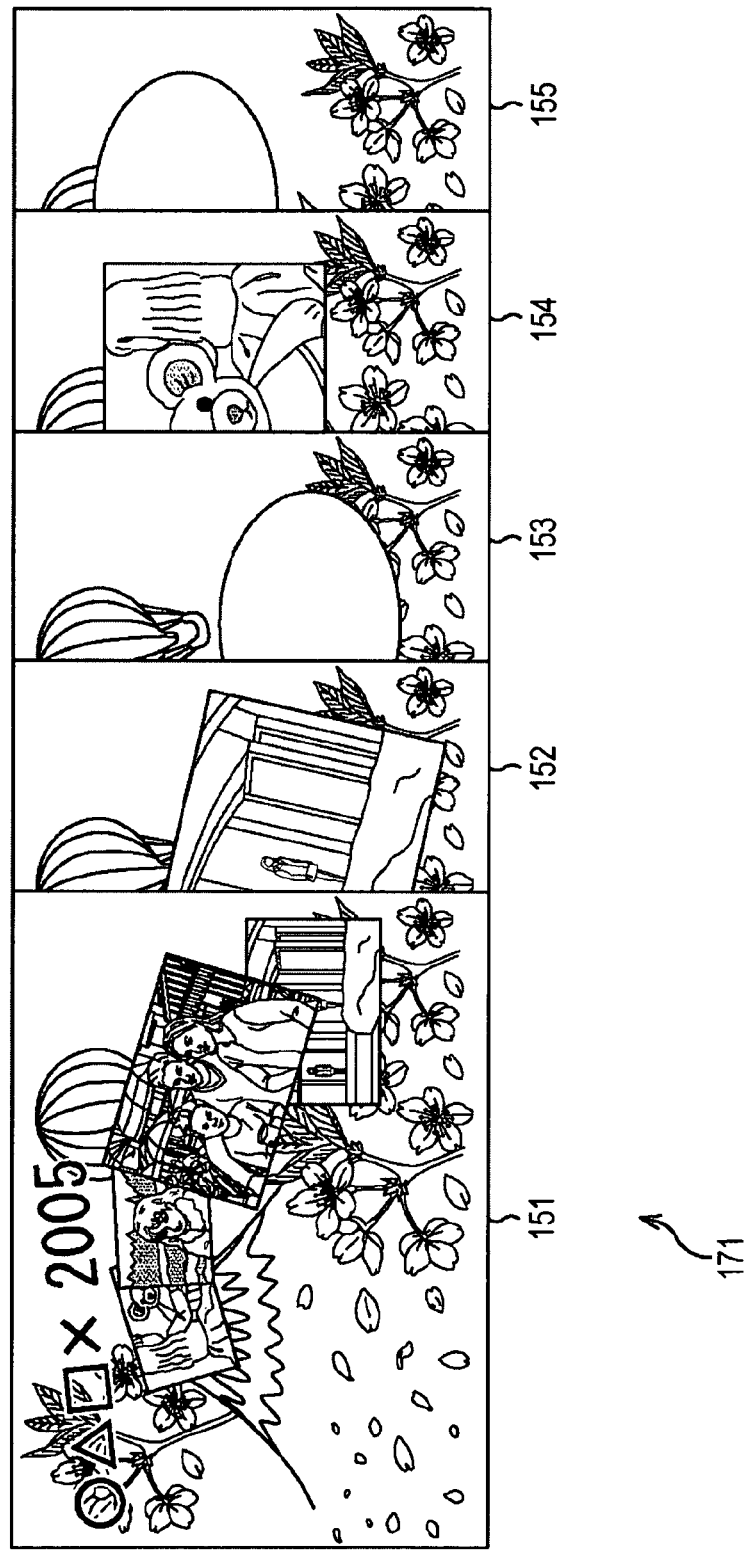
FIG. 11 shows an example of the configuration of a scrapbook.

FIG. 11 shows an example of the configuration of a scrapbook created.

In the example shown in FIG. 11, a scrapbook 171 includes five pages, i.e., pages 151 to 155. All of images arranged in the pages 151 to 155 in the scrapbook 171 have metadata indicating the same event. The background template 111 corresponding to the metadata is set for the scrapbook 171. The page 151 becomes a book cover of the scrapbook 171. As in the page 151, a predetermined number of images defined by the corresponding layout template 131 are arranged in each of the pages 152 to 155.

Any of the pages 151 to 155 may have an image of the face of a certificate, note, stamp, ticket, coupon, or the like.

On the other hand, when it is determined in step S32 that a scrapbook is not to be automatically created, the process proceeds to step S44. In steps S44 to S49, a scrapbook is manually created.

In step S44, on the basis of a signal that is supplied from the operation unit 19 and that is indicative of a user operation for selecting images in the read predetermined folder, the operation-input obtaining unit 51 supplies information indicating the images selected by the user and contained in the predetermined folder to the recording/reproducing control unit 52. On the basis of the information that is supplied from the operation-input obtaining unit 51 and that is indicative of the images selected by the user, the recording/reproducing control unit 52 reads the image data, selected by the user, from the predetermined folder. The recording/reproducing control unit 52 supplies the selected image data to the content creating unit 58.

In step S45, the computing unit 72 in the content creating unit 58 groups the image data selected in step S44 into one cluster.

In step S46, on the basis of a signal that is supplied from the operation unit 19 and that is indicative of a user operation for selecting a background template, the operation-input obtaining unit 51 supplies information indicating the background template selected by the user to the recording/reproducing control unit 52.

In step S47, on the basis of the information that is supplied from the operation-input obtaining unit 51 and that is indicative of the background template selected by the user, the recording/reproducing control unit 52 reads the background template from the recording/reproducing unit 18.

In step S48, the template setting unit 73 obtains the selected background template from the recording/reproducing control unit 52. The template setting unit 73 then sets the background template, obtained from the recording/reproducing control unit 52, for the cluster of the grouped images.

In step S49, on the basis of the metadata attached to the images in the group, the computing unit 72 clusters the images for each sub-event to divide the images into pages for respective sub-events. The process then proceeds to step S38.

As described above, the HDD recorder 1 can create a scrapbook in which images divided into groups on the basis of the metadata are arranged for each group.

The scrapbook may be a combination of new image data created from the image data or may be edited data that specifies the display positions of images by referring to the image data.

In addition, the scrapbook may be linked with other scrapbooks. Specifically, associating predetermined metadata attached to images arranged in scrapbooks each other allows the scrapbooks to be linked with each other. For example, scrapbooks in which the same image is arranged may be linked with each other.

The metadata update processing executed in step S42 shown in FIG. 7 will be described next with reference to a flowchart shown in FIG. 14.

In step S51, the content creating unit 58 extracts all metadata of the images contained in the scrapbook.

In step S52, the content creating unit 58 causes all the extracted image metadata to be reflected in the metadata of the scrapbook item by item so that the contents of the metadata do not overlap each other.

For example, the metadata of a scrapbook as described above with reference to FIG. 12 do not necessarily include all the contents of the metadata of an image as illustrated in FIG. 13. Accordingly, the content creating unit 58 extracts all the metadata of the images contained in the scrapbook and causes all the metadata of the images to be reflected in the metadata of the scrapbook item by item so that the contents of the metadata do not overlap each other. As a result of the processing in step S51, for example, as shown in FIG. 15, metadata that include comments, face recognition data, and so on attached to the images contained in the scrapbook are generated as the metadata of the scrapbook.

In step S53, the content creating unit 58 causes part of the contents of the metadata of the scrapbook to be reflected in the metadata of each image.

That is, the content creating unit 58 adds part (e.g., the scrapbook title) of the contents of the metadata of the scrapbook to the metadata of each image.

In step S54, the content creating unit 58 adds information indicating a corresponding page number of the scrapbook to the metadata of each image. The processing then ends.

That is, the content creating unit 58 extracts information indicating on what page of the scrapbook each image is shown and adds information indicating the corresponding page number of the scrapbook to the metadata of each image.

As a result of such processing, the metadata of the image are updated as shown in FIG. 16.

Automatic scrapbook creation processing performed by the HDD recorder 1 will be described next.

For example, when an image is added to the image database 31 in the recording/reproducing unit 18, the control unit 20 in the HDD recorder 1 performs processing for automatically creating a scrapbook. For example, the control unit 20 may be configured to perform processing for automatically creating a scrapbook, when the number of images recorded in the image database 31 reaches a predetermined number. In addition, for example, the control unit 20 may be configured to perform processing for automatically creating a scrapbook at predetermined time intervals.

Figure 17:
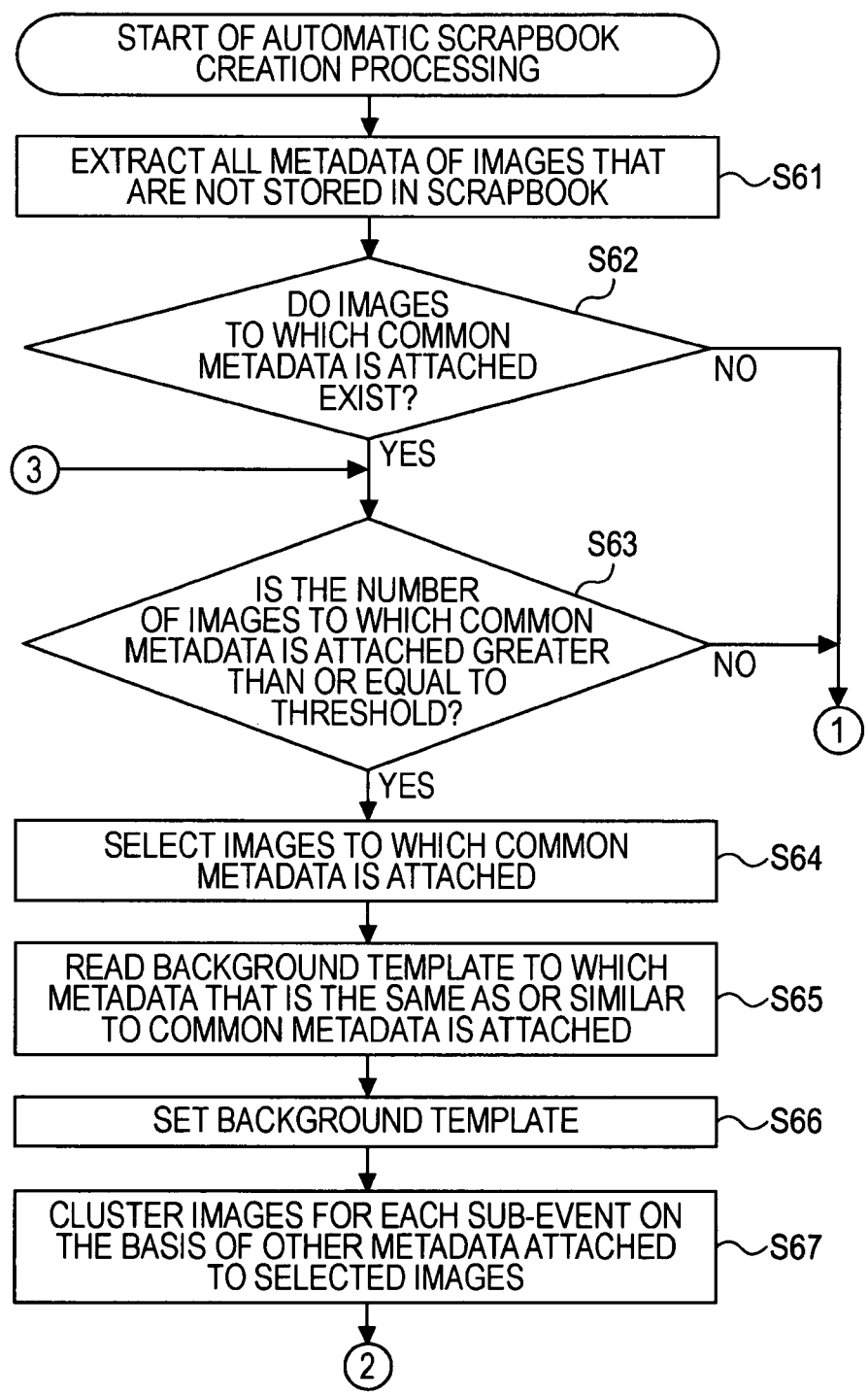
FIG. 17 is a flowchart illustrating an example of automatic scrapbook creation processing.
Figure 18:
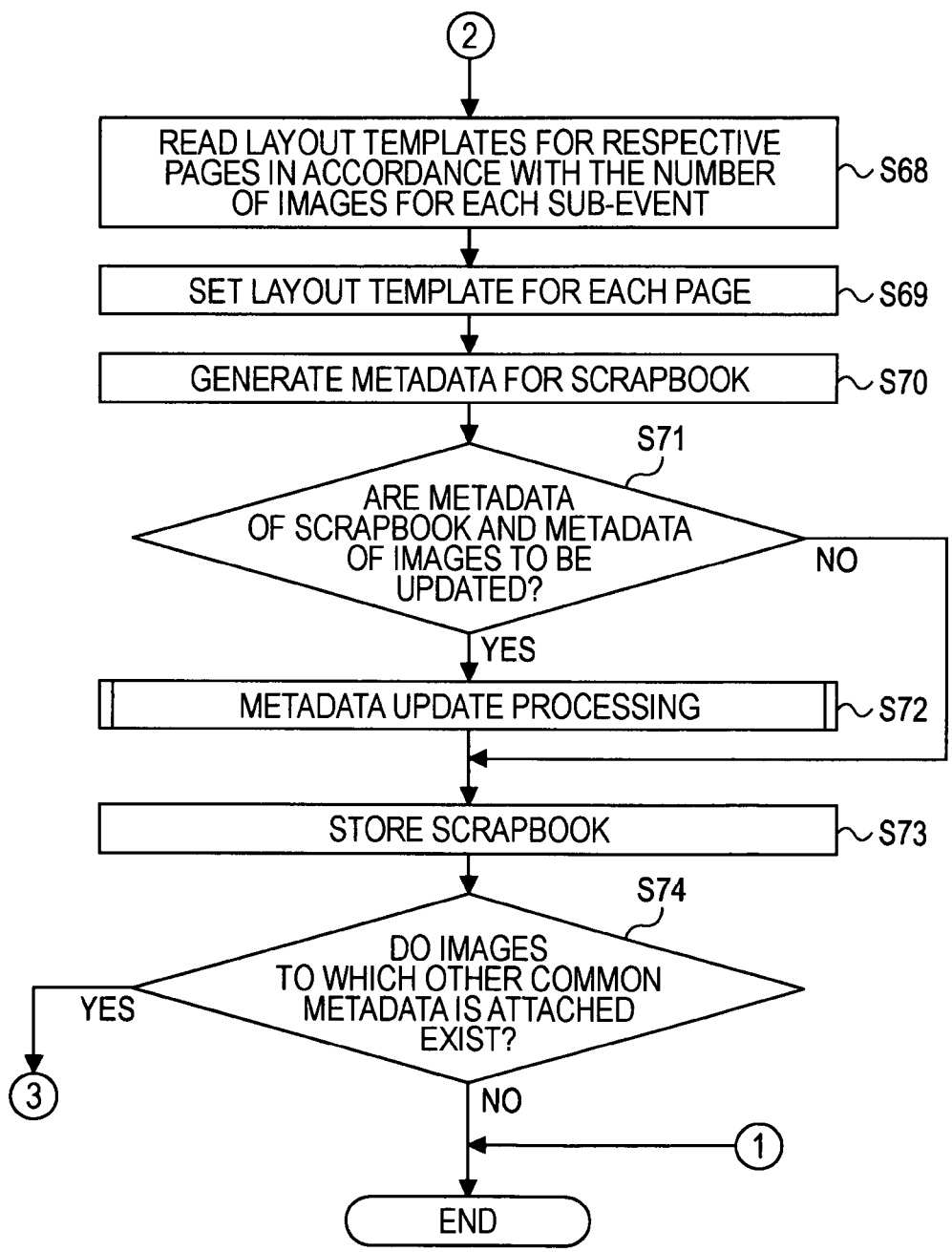
FIG. 18 is a flowchart illustrating an example of the automatic scrapbook creation processing.

FIGS. 17 and 18 are flowcharts showing an example of the automatic scrapbook creation processing performed by the HDD recorder 1.

In step S61, the recording/reproducing control unit 52 reads, from the recording/reproducing unit 18, all image data of images that are not stored in the scrapbook. The metadata extracting unit 57 extracts the metadata attached to all the image data that are read by the recording/reproducing control unit 52 and that are not stored in the scrapbook.

In step S62, the metadata extracting unit 57 also determines whether or not common metadata exists in the extracted metadata. That is, the metadata extracting unit 57 determines whether or not images to which common metadata is attached exist.

Upon determining that common metadata exists in step S62, the metadata extracting unit 57 determines the number of pieces of common metadata, i.e., the number of images to which the same metadata is attached, and supplies the determined number of pieces of common metadata to the number-of-common-metadata determining unit 59. The process then proceeds to step S63.

In step S63, the number-of-common-metadata determining unit 59 determines whether or not the number of images to which the same metadata is attached, the number being supplied from the metadata extracting unit 57, is greater than or equal to a predetermined threshold obtained from the operation-input obtaining unit 51. When it is determined in step S63 that the number of images to which the same metadata is attached is greater than or equal to the predetermined threshold, the number-of-common-metadata determining unit 59 supplies, to the content creating unit 58, information indicating that the number of images to which the same metadata is attached is greater than or equal to the predetermined threshold and the metadata extracting unit 57 supplies the common metadata to the content creating unit 58. The process then proceeds to step S64.

In step S64, in accordance with the information that is supplied from the number-of-common-metadata determining unit 59 and that indicates that the number of images to which the same metadata is attached is greater than or equal to the predetermined threshold and on the basis of the common metadata supplied from the metadata extracting unit 57, the content creating unit 58 obtains the image data to which the common metadata is attached from the image data that are read by the recording/reproducing control unit 52 and that are not stored in the scrapbook.

In step S65, the synonym obtaining unit 60 obtains, from the dictionary database 34 in the recording/reproducing unit 18, synonyms of the metadata attached to the image data read by the recording/reproducing control unit 52, the common metadata being attached to the image data. The synonym obtaining unit 60 supplies the obtained synonyms to the content creating unit 58. On the basis of the metadata supplied from the metadata extracting unit 57 or the synonyms supplied from the synonym obtaining unit 60, the template setting unit 73 in the content creating unit 58 reads a background template or background templates to which metadata corresponding to the metadata supplied from the metadata extracting unit 57 or metadata corresponding to the synonyms supplied from the synonym obtaining unit 60 are attached.

In step S66, the template setting unit 73 sets the read background template for the images to which the common metadata is attached.

In step S67, the computing unit 72 clusters the images for each sub-event, on the basis of other metadata attached to the images to which the common metadata is attached.

The processing in steps S68 to S73 in the flowchart shown in FIGS. 17 and 18 is analogous to the processing in steps S38 to S43 in the flowchart shown in FIGS. 6 and 7, and thus, a description thereof is not given hereinbelow.

In step S74, the metadata extracting unit 57 determines whether or not other common metadata exist, i.e., whether or not images to which other common metadata is attached exist. When it is determined in step S74 that other common metadata does not exist, the processing ends.

On the other hand, when it is determined in step S74 that other common metadata exists, the process returns to step S63 and the processing subsequent thereto is repeated.

When it is determined in step S62 that no common metadata exists, the processing ends. When it is determined in step S63 that the number of images to which the same metadata is attached is smaller than the predetermined threshold, the processing ends.

As described above, when the number of images to which common metadata is attached is greater than or equal to the predetermined threshold, the HDD recorder 1 can automatically create a scrapbook that includes images to which the common metadata is attached.

Processing for adding an image to a scrapbook, the processing being performed by the HDD recorder 1, will be described next.

For example, when an image or images are added to the image database 31 in the recording/reproducing unit 18, the control unit 20 in the HDD recorder 1 performs processing for adding the image(s) to a scrapbook. For example, the control unit 20 may be configured to perform processing for adding images to a scrapbook, when the number of images recorded in the image database 31 reaches a predetermined number. In addition, for example, the control unit 20 may be configured to perform processing for adding an image or images to a scrapbook at predetermined time intervals.

Figure 19:
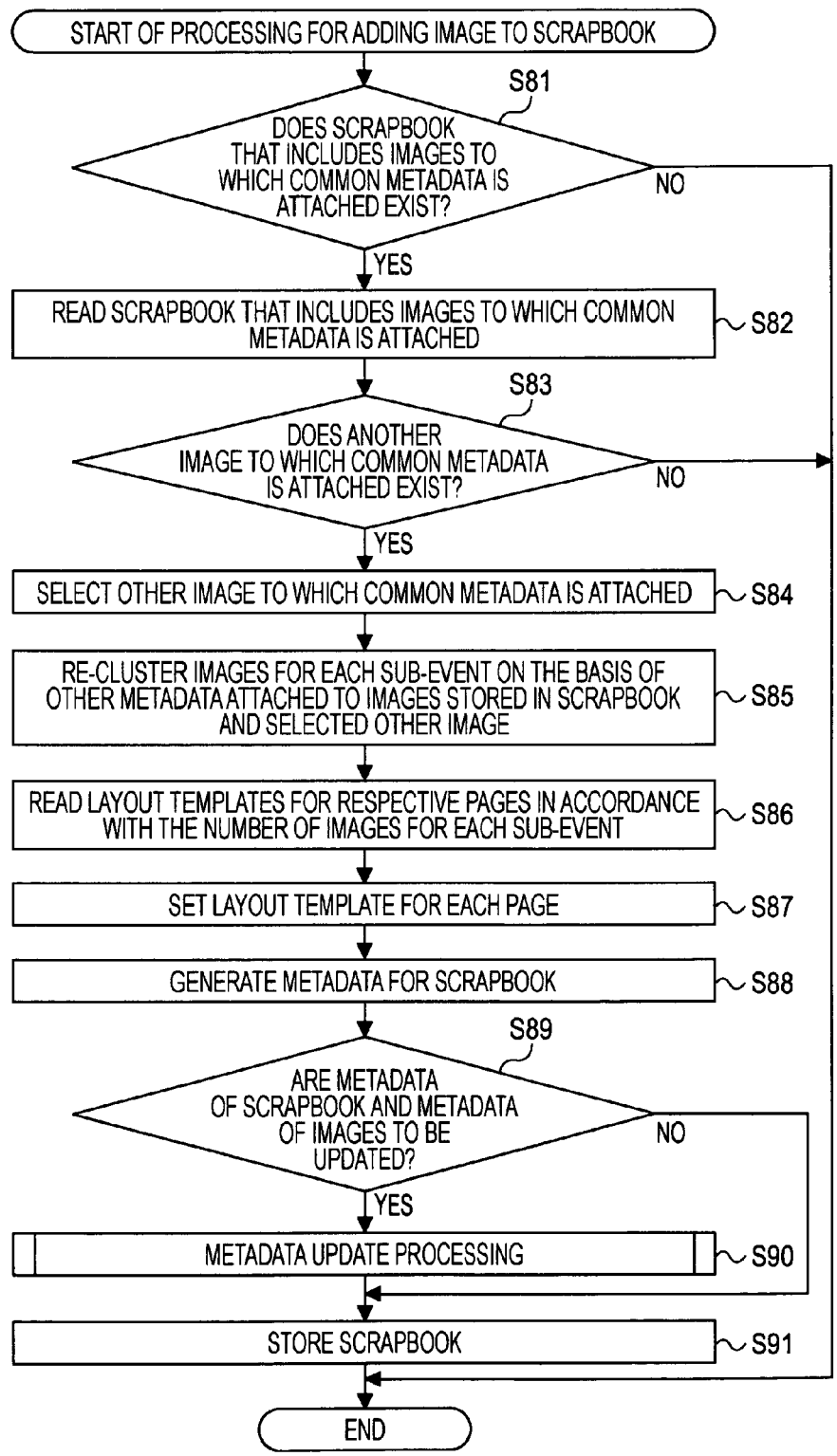
FIG. 19 is a flowchart illustrating an example of processing for adding an image to a scrapbook.

FIG. 19 is a flowchart showing an example of the processing for adding an image to a scrapbook, the processing being performed by the HDD recorder 1.

In step S81, the recording/reproducing control unit 52 determines whether or not a scrapbook that includes images to which common metadata is attached exists. For example, by referring to history information indicating that a scrapbook that includes images to which common metadata is attached is created in the scrapbook creation processing shown in FIGS. 17 and 18, the recording/reproducing control unit 52 determines whether or not a scrapbook that includes images to which common metadata is attached exists. When it is determined in step S81 that a scrapbook that includes images to which common metadata is attached exists, the process proceeds to step S82.

In step S82, on the basis of the history information indicating that a scrapbook that includes images to which common metadata is attached is created, the recording/reproducing control unit 52 reads the scrapbook that includes images to which common metadata is attached from the recording/reproducing unit 18. The recording/reproducing control unit 52 also reads all image data of images that are not stored in the scrapbook. The metadata extracting unit 57 extracts metadata of the scrapbook read by the recording/reproducing control unit 52 and metadata attached to all the image data that are not stored in the scrapbook.

In step S83, the metadata extracting unit 57 determines whether or not common metadata that is attached to the scrapbook exists in the metadata attached to all the image data that are not stored in the extracted scrapbook. That is, the metadata extracting unit 57 determines whether or not another image to which the common metadata is attached exists.

When it is determined in step S83 that the common metadata exists, the metadata extracting unit 57 supplies the common metadata to the content creating unit 58 and the process proceeds to step S84.

In step S84, on the basis of the common metadata supplied from the metadata extracting unit 57, the content creating unit 58 selects other image data to which the common metadata is attached from the image data that are not stored in the scrapbook read by the recording/reproducing control unit 52. The content creating unit 58 also selects image data stored in the scrapbook that includes the images to which the common metadata is attached.

In step S85, the computing unit 72 re-clusters the images for each sub-event, on the basis of other metadata attached to the image data stored in the scrapbook and the other image to which the common metadata is attached.

The processing in steps S86 to S91 in the flowchart shown in FIG. 19 is analogous to the processing in steps S38 to S43 in the flowchart shown in FIGS. 6 and 7, and thus, a description thereof is not given hereinbelow.

On the other hand, when it is determined in step S81 that a scrapbook that includes images to which common metadata is attached does not exist, the processing ends.

When it is determined in step S83 the common metadata does not exist, the processing ends.

As described above, the HDD recorder 1 can add an image or images to an already created scrapbook that includes images to which common metadata is attached.

Although the HDD recorder 1 has been described above as creating a scrapbook on the basis of metadata pre-attached to image data, the HDD recorder 1 may attach new metadata to an already created scrapbook.

Processing for attaching metadata to a scrapbook, the processing being performed by the HDD recorder 1, will now be described in more detail.

For example, when the operation unit 19 is operated and the control unit 20 in the HDD recorder 1 obtains an instruction for metadata attaching processing, the control unit 20 starts the processing.

Figure 20:
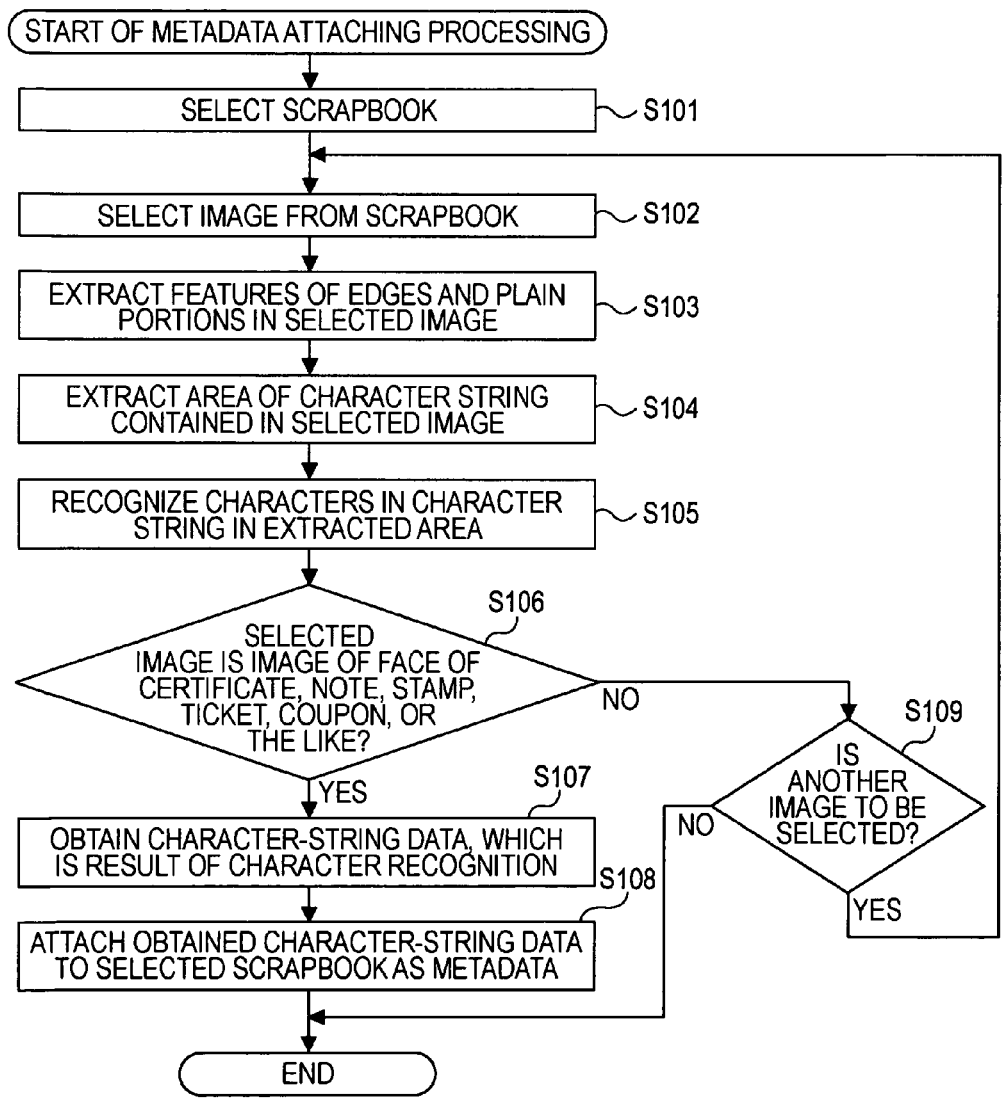
FIG. 20 is a flowchart illustrating another example of the metadata attaching processing.

FIG. 20 is a flowchart showing an example of the processing for attaching metadata to a scrapbook, the processing being performed by the HDD recorder 1.

In step S101, on the basis of a signal that is supplied from the operation unit 19 and that is indicative of a user operation for selecting a scrapbook displayed on the monitor 2, the operation-input obtaining unit 51 supplies information indicating the scrapbook selected by the user to the recording/reproducing control unit 52. On the basis of the supplied information indicating the scrapbook selected by the user, the recording/reproducing control unit 52 reads data of the scrapbook selected by the user from the recording/reproducing unit 18.

In step S102, the operation-input obtaining unit 51 selects predetermined image data from the scrapbook data read by the recording/reproducing control unit 52. The recording/reproducing control unit 52 supplies the selected image data to the feature extracting unit 54.

The processing in steps S103 to S105 in the flowchart shown in FIG. 20 is analogous to the processing in steps S12 to S14 in the flowchart shown in FIG. 5, and thus, a description thereof is not given hereinbelow.

When it is determined in step S106 that the image read by the recording/reproducing control unit 52 is an image of the face of a certificate, note, stamp, ticket, coupon, or the like on which a character string is shown, the process proceeds to step S107.

In step S107, the image determining unit 55 obtains character-string data on the basis of the recognized character string. The image determining unit 55 supplies the obtained character-string data to the metadata attaching unit 56.

In step S108, the metadata attaching unit 56 supplies the character-string data as metadata, the character-string data being supplied from the image determining unit 55, to the recording/reproducing control unit 52. More specifically, the metadata attaching unit 56 attaches the character-string data as metadata for the scrapbook, the character-string data being supplied from the image determining unit 55, to the scrapbook read by the recording/reproducing control unit 52. The processing then ends.

When it is determined in step S106 that the image read by the recording/reproducing control unit 52 is not an image of the face of a certificate, note, stamp, ticket, coupon, or the like on which a character string is shown, the process proceeds to step S109.

In step S109, on the basis of a signal that is supplied from the operation unit 19 and that is indicative of a user operation for expressing whether or not another image is to be selected from the scrapbook, the operation-input obtaining unit 51 supplies information indicating whether or not another image is to be selected from the scrapbook to the recording/reproducing control unit 52. That is, the recording/reproducing control unit 52 determines whether or not another image is to be selected from the scrapbook.

When it is determined in step S109 that another image is to be selected from the scrapbook, the process returns to step S102 and the processing subsequent thereto is repeated.

On the other hand, when it is determine in step S109 that another image is not to be selected from the scrapbook, the processing ends.

As described above, the control unit 20 can attach, to the scrapbook as metadata, the character-string data of a character string in the image of the face of a certificate, note, stamp, ticket, coupon, or the like, the character-string data being stored in the scrapbook.

Scrapbook display processing performed by the HDD recorder 1 will be described next.

For example, when the operation unit 19 is operated and the control unit 20 in the HDD recorder 1 obtains an instruction for scrapbook display processing, the control unit 20 starts the processing.

Figure 21:
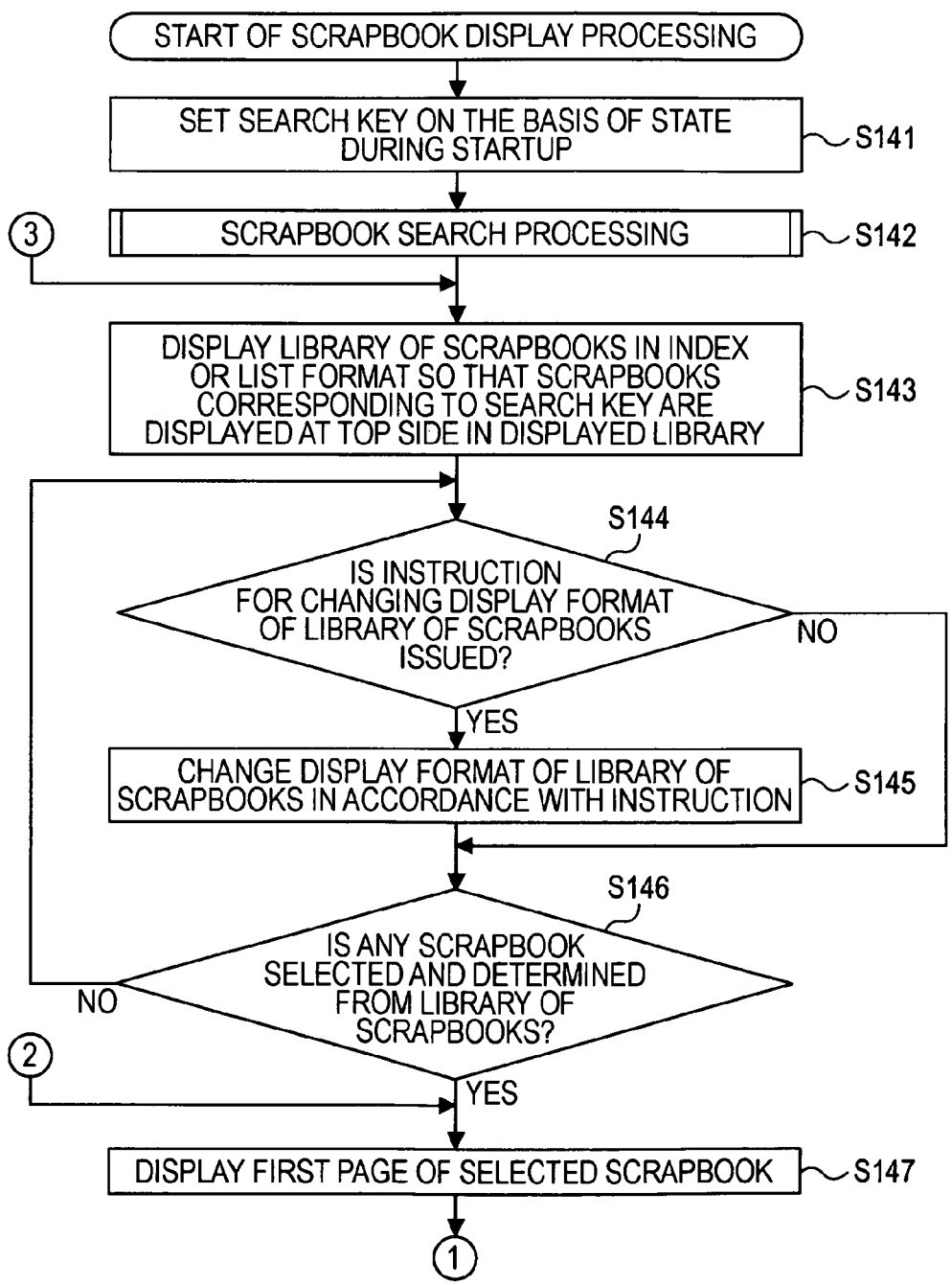
FIG. 21 is a flowchart illustrating an example of scrapbook display processing.
Figure 22:
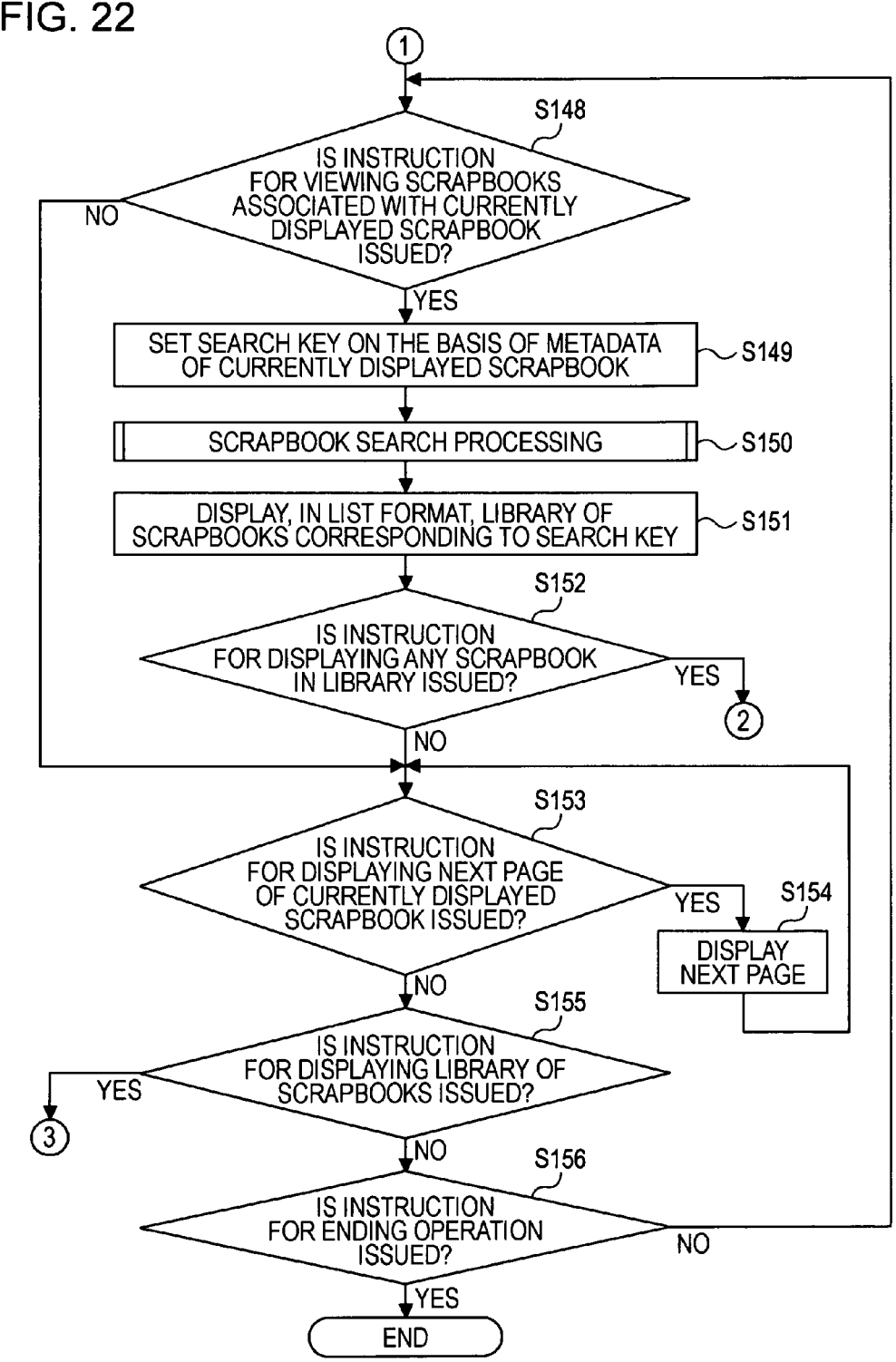
FIG. 22 is a flowchart illustrating an example of the scrapbook display processing.

FIGS. 21 and 22 are flowcharts showing an example of the scrapbook display processing.

In step S141, the information obtaining unit 61 sets a search key, on the basis of the state during startup. Specifically, upon power on or upon start of an application, the information obtaining unit 61 can obtain year, month, day, and time information from the internal timer, can extract and obtain a keyword that seems to be currently popular from, for example, top rakings of search keywords on a search engine on the Internet and/or the contents of descriptions of top pages (which are the so-called portal sites) via the network interface 24, and can set the obtained keyword as a search key.

When the HDD recorder 1 is configured to have a user login function and to allow for pre-registration of user information, the information obtaining unit 61 can also extract and obtain a keyword that seems to match a logged-in user's preference from registration information of the user and can set the obtained keyword as a search key.

In addition, when the HDD recorder 1 is configured to be able to obtain an EPG (electronic program guide) together with AV (audio video) signals supplied from the external apparatus (not shown) or analog signals supplied from the analog tuner (not shown) or the line tuner (not shown), the information obtaining unit 61 can extract and obtain a keyword that seems to be currently popular, on the basis of keywords contained in an EPG obtained in a predetermined period of time, for example, one week or one month, and can set the keyword as a search key. In addition, the information obtaining unit 61 can also extract and obtain a keyword that seems to match the user's preference, for example, on the basis of keywords contained in an EPG of program data recorded/reproduced by the HDD recorder 1 in a predetermined period of time, such as one week or one month, and can set the obtained keyword as a search key.

Figure 27:
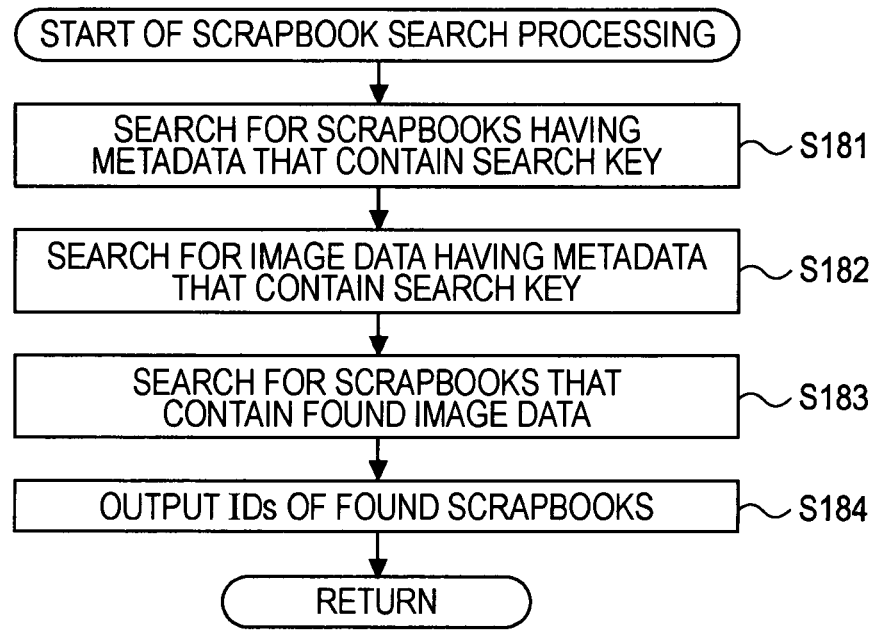
FIG. 27 is a flowchart illustrating an example of scrapbook search processing.

In step S142, scrapbook search processing, which is described below with reference to a flowchart shown in FIG. 27, is executed.

In step S143, the recording/reproducing control unit 52 reads all scrapbooks recorded in the recording/reproducing unit 18. The recording/reproducing control unit 52 supplies display data for displaying a library of the scrapbooks to the display control unit 53. Under the control of the control unit 20, the HDD recorder 1 displays, on the monitor 2, the library of scrapbooks in an index format or list format so that a scrapbook or scrapbooks corresponding to the search key are displayed at the top side in the displayed library.

Figure 23:
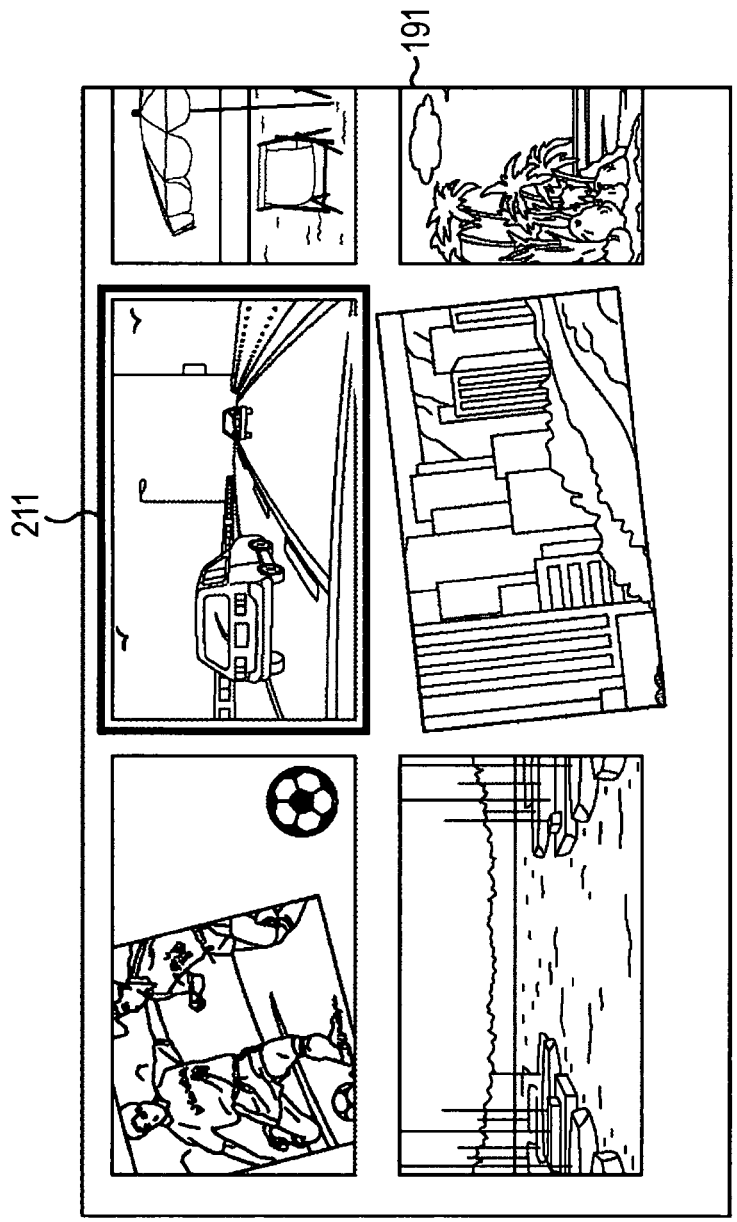
FIG. 23 shows an example of display of a library of scrapbooks.

FIG. 23 shows an example of the library of scrapbooks displayed in an index format. In the example shown in FIG. 23, on a screen 191 of the monitor 2, first pages that become the book covers of the respective scrapbooks are displayed in the library. By operating the operation unit 19 to move a cursor 211, the user can select one of the scrapbooks.

In step S144, on the basis of a signal that is supplied from the operation unit 19 and that is indicative of a user operation, the operation-input obtaining unit 51 determines whether or not an instruction for changing the display format of the library of scrapbooks is issued.

When it is determined in step S144 that an instruction for changing the display format of the library of scrapbooks is issued, the process proceeds to step S145. In step S145, the recording/reproducing control unit 52 controls the display control unit 53 to change the display format of the library of scrapbooks displayed on the monitor 2, in accordance with the user instruction.

Figure 24:
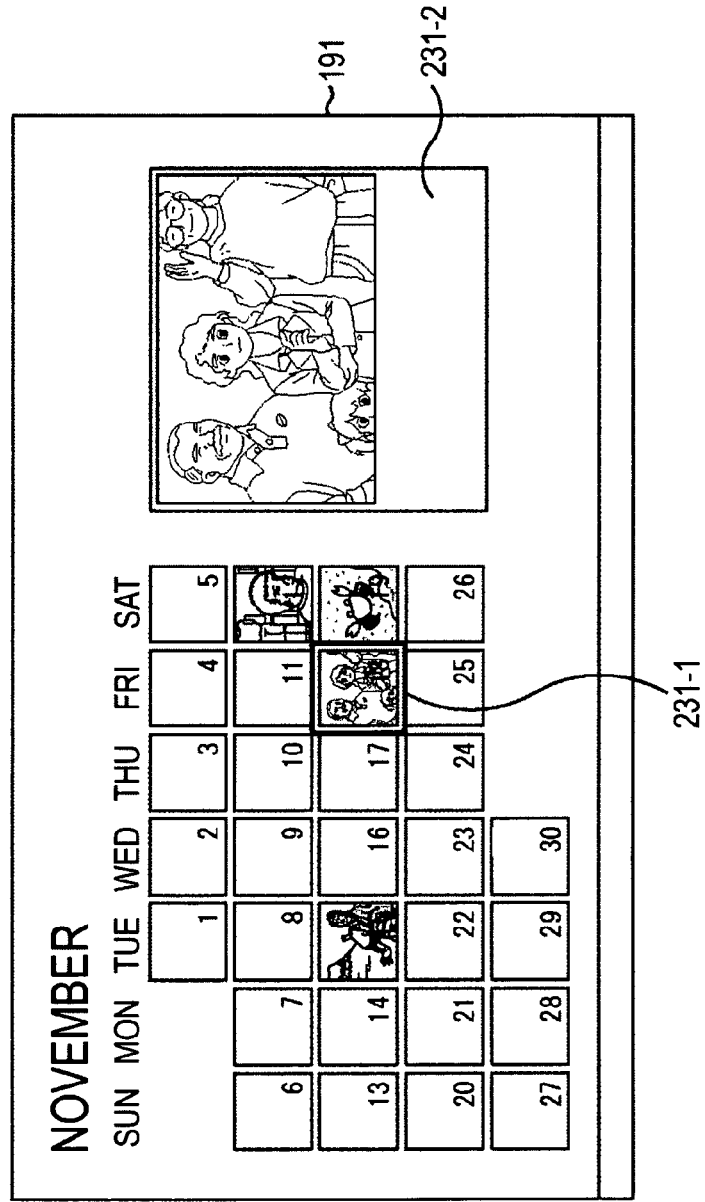
FIG. 24 shows another example of display of the library of scrapbooks.
Figure 25:
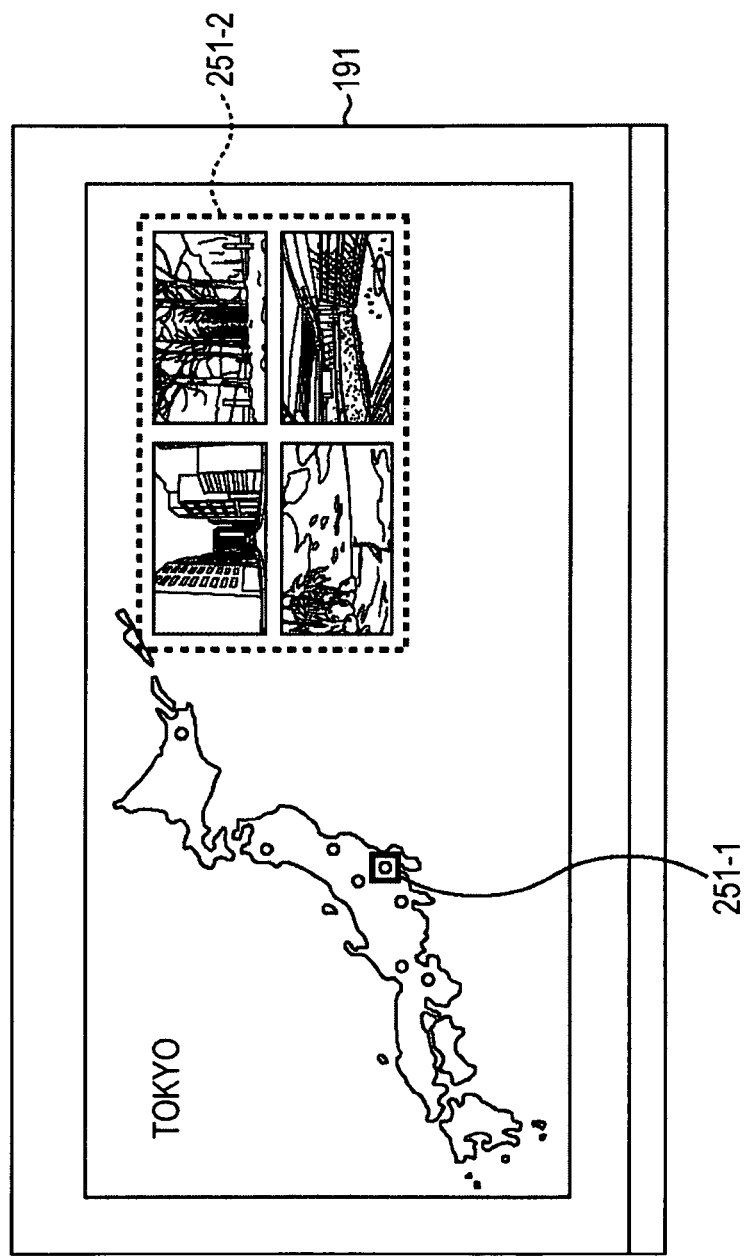
FIG. 25 shows still another example of display of the library of scrapbooks.

FIGS. 24 and 25 show examples of the library of scrapbooks displayed on the monitor 2.

FIG. 24 shows an example of the library of scrapbooks displayed in conjunction with a calendar. The screen 191 of the monitor 2 has a calendar display area displayed at the left side and a preview-screen display area displayed at the right side. In the calendar display area, on the basis of metadata that are attached to scrapbooks and that are indicative of dates, the first pages that become the book covers of the respective scrapbooks are displayed in the fields of the corresponding dates in the calendar. In the preview-screen display area, a preview screen 231-2 for a scrapbook that exists on the date selected by a cursor 231-1 in the calendar display area is displayed.

More specifically, in the example shown in FIG. 24, "November 18" is selected by the cursor 231-1 in the calendar display area showing November. The preview-screen display 231-2 for the scrapbook to which the metadata of the selected "November 18" is attached is displayed in the preview-screen display area.

FIG. 25 shows an example of the library of scrapbooks displayed in conjunction with a map. The screen 191 of the monitor 2 has a map display area displayed at the left side and a library display area displayed at the right side. A map showing a predetermined region is displayed in the map display area. The user can select a predetermined location on the displayed map. The library of scrapbooks to which metadata indicating the location selected by the user is attached is displayed in the library display area.

In the example shown in FIG. 25, "Tokyo" on the map in the map display area is selected by a cursor 251-1. The book covers of scrapbooks to which metadata "Tokyo" is attached are displayed in a library display area 251-2. The user can select one of the scrapbooks in the displayed library.

As described above, the user can select one of the scrapbooks in the displayed library.

When it is determined in step S144 that an instruction for changing the display format of the library of scrapbooks is not issued or after the processing in step S145 is completed, the process proceeds to step S146. In step S146, the operation-input obtaining unit 51 determines whether or not any of the scrapbooks is selected and determined from the library of scrapbooks, on the basis of a signal supplied from the operation unit 19. When it is determined in step S146 that no scrapbook is selected and determined, the process returns to step S144 and the processing subsequent thereto is repeated.

When it is determined in step S146 that one of the scrapbooks is selected and determined, the process proceeds to step S147. In step S147, on the basis of a signal that indicates a user operation for selecting one of the scrapbooks from the library displayed on the monitor 2, the operation-input obtaining unit 51 supplies information indicating the selected one of the scrapbooks in the library to the recording/reproducing control unit 52. The recording/reproducing control unit 52 reads data of the selected and determined scrapbook, and controls the display control unit 53 to display the first page of the selected scrapbook on the monitor 2.

In step S148, the operation-input obtaining unit 51 determines whether or not an instruction for viewing scrapbooks associated with the currently displayed scrapbook or a currently created scrapbook is issued. When it is determined in step S148 that an instruction for viewing associated scrapbooks is not issued, the process proceeds to step S153.

When it is determined in step S148 that an instruction for viewing associated scrapbooks is issued, the process proceeds to step S149. In step S149, the recording/reproducing control unit 52 sets a search key on the basis of the metadata of the currently displayed scrapbook or the currently created scrapbook.

That is, for example, when the metadata of the currently displayed scrapbook or the currently created scrapbook are the metadata described above with reference to FIG. 12, the recording/reproducing control unit 52 sets "Izu Trip", "8/15", "8/16", and "8/17" as search keys. For example, when the metadata of the currently displayed scrapbook or the currently created scrapbook are the metadata described above with reference to FIG. 15, the recording/reproducing control unit 52 sets, as search keys, "Izu Trip", "8/15", "8/16", "8/17", "On Beach", "BBQ", other comments, and face recognition data registered as metadata.

In step S150, the scrapbook search processing, which is described below with reference to FIG. 27, is executed.

In step S151, the recording/reproducing control unit 52 reads all found scrapbooks from the recording/reproducing unit 18. The recording/reproducing control unit 52 supplies display data for displaying a library of the scrapbooks to the display control unit 53. Under the control of the control unit 20, the HDD recorder 1 displays, in a list format on the monitor 2, the library of scrapbooks corresponding to the search key(s) so that scrapbooks having higher degrees of matching with the search key(s) are displayed at the top side in the displayed library.

Figure 26:
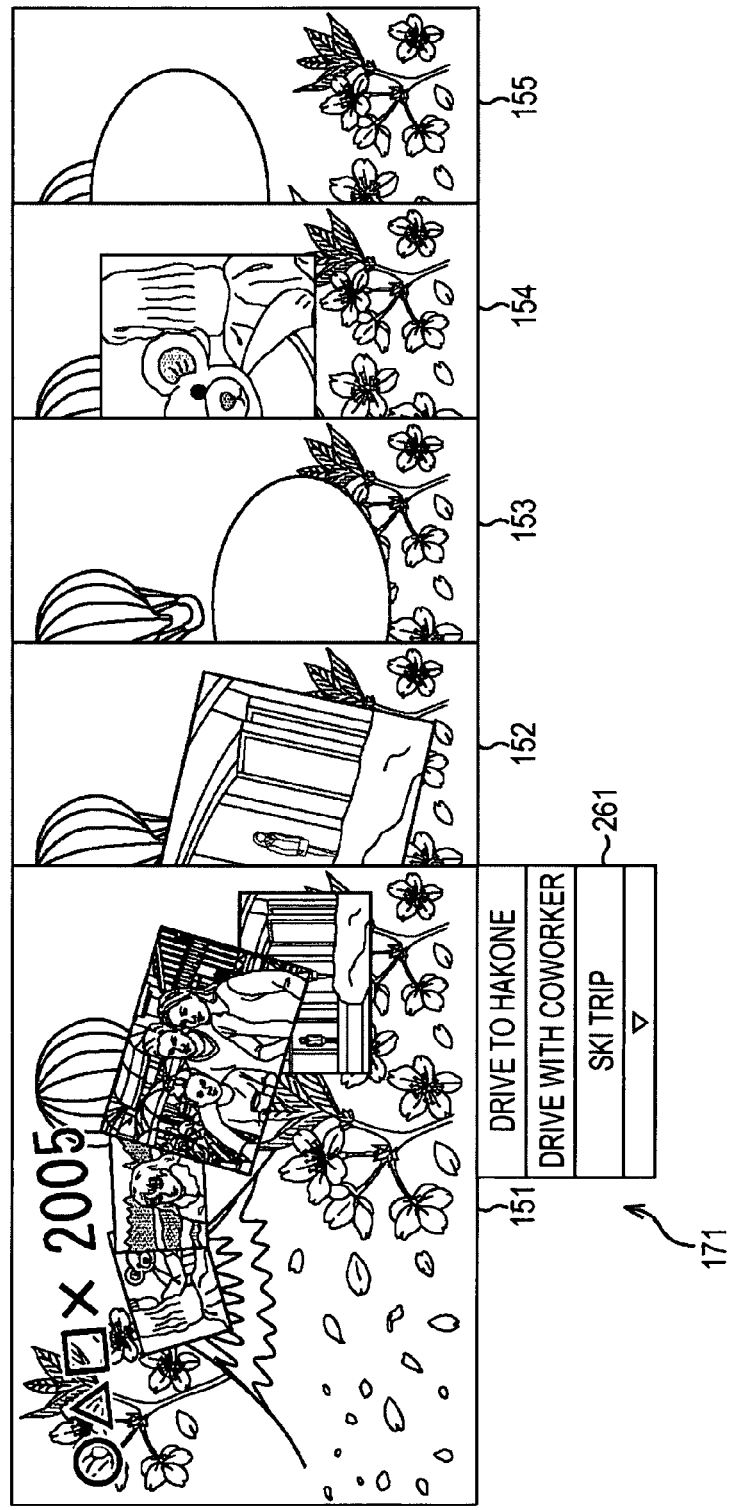
FIG. 26 shows yet another example of display of the library of scrapbooks.

For example, with a scrapbook being displayed, when an instruction for viewing associated scrapbooks is issued through button operation and/or key operation, a dropdown list box 261 is displayed as shown in FIG. 26. In the dropdown list box 261, a library of scrapbooks corresponding to the search key(s) is shown so that scrapbooks having higher degrees of matching with the search key(s) are displayed at the top side in the displayed library.

By selecting and determining a desired one of the scrapbooks displayed in the dropdown list box 261, the user can select the desired scrapbook from the scrapbooks associated with the currently displayed scrapbook and can display the selected scrapbook.

In step S152, on a signal supplied from the operation unit 19, the operation-input obtaining unit 51 determines whether or not any scrapbook in the library is selected and determined. When it is determined in step S152 that one of the scrapbooks is selected and determined, the process returns to step S147 and the processing subsequent thereto is repeated.

When it is determined in step S148 that an instruction for viewing associated scrapbooks is not issued or when it is determined in step S152 that no scrapbook is selected and determined, the process proceeds to step S153. In step S153, on the basis of a signal supplied from the operation unit 19, the operation-input obtaining unit 51 determines whether or not an instruction for displaying a next page of the currently displayed scrapbook is issued.

When it is determined in step S153 that an instruction for displaying a next page of the currently displayed scrapbook is issued, the process proceeds to step S154. In step S154, the operation-input obtaining unit 51 supplies a signal indicating the user operation to the recording/reproducing control unit 52. The recording/reproducing control unit 52 controls the display control unit 53 to display a next page of the scrapbook on the monitor 2. The process then returns to step S153 and the processing subsequent thereto is repeated.

When it is determined in step S153 that an instruction for displaying a next page of the currently displayed scrapbook is not issued, the process proceeds to step S155. In step S155, on the basis of a signal supplied from the operation unit 19, the operation-input obtaining unit 51 determines whether or not an instruction for displaying the library of scrapbooks is issued. When it is determined in step S155 that an instruction for displaying the library of scrapbooks is issued, the process returns to step S143 and the processing subsequent thereto is repeated.

When it is determined in step S155 that an instruction for displaying the library of scrapbooks is not issued, the process proceeds to step S156. In step S156, on the basis of a signal supplied from the operation unit 19, the operation-input obtaining unit 51 determines whether or not an instruction for ending the operation is issued. When it is determined in step S156 that an instruction for ending the operation is not issued, the process returns to step S148 and the processing subsequent thereto is repeated. When it is determined in step S156 that an instruction for ending the operation is issued, the processing ends.

As a result of such processing, scrapbooks that are found with keywords in which the user is assumed to be interested can be displayed at the top side in the library on the basis of the state during power up or application startup, what is currently popular, or the user's preference. Thus, scrapbooks that are classified on the basis of the metadata can be preferentially displayed in order of decreasing possibility of the user's interest. In addition, as a result of such processing, when the user is referring to any of the scrapbooks, scrapbooks associated with the scrapbook can be searched for and be recommended.

The scrapbook search processing executed in step S142 shown in FIG. 21 and in step S150 shown in FIG. 22 will be described next with reference to FIG. 27.

In step S181, the recording/reproducing control unit 52 searches the content database 33 in the recording/reproducing unit 18 for scrapbooks having metadata that contain the search key(s).

For example, when year, month, day and time information is set as the search key(s) in step S141 shown in FIG. 21, scrapbooks having metadata indicating the same day last year or a few years ago or days within a predetermined range from the same time on the same day are searched for. One example of the predetermined range is one week before and after the same day last year or a few years ago. When a keyword that is currently popular and/or a keyword indicating the user's preference is set as the search key(s), scrapbooks having metadata indicating the keyword(s) are searched for.

In step S182, the recording/reproducing control unit 52 searches the image database 31 in the recording/reproducing unit 18 for image data having metadata that contain the search key(s).

For example, when year, month, day, and time information is set as the search key(s) in step S141 shown in FIG. 21, images having metadata indicating the same day last year or a few years ago or days within a predetermined range from the same time on the same day are searched for. One example of the predetermined range is one week before and after the same day last year or a few years ago. When a keyword that is currently popular and/or a keyword indicating the user's preference is set as the search key(s), images having metadata indicating the keyword(s) are searched for.

In step S183, the recording/reproducing control unit 52 searches the content database 33 in the recording/reproducing unit 18 for scrapbooks that contain the image data found in step S182.

In step S184, the recording/reproducing control unit 52 outputs the found scrapbooks to the display control unit 53. The process then returns to step S142 in FIG. 21 to proceed to S143 or returns to step S150 in FIG. 22 to proceed to S151.

As a result of the processing described above, a scrapbook having metadata corresponding to the keyword(s) or a scrapbook containing image data having metadata corresponding to the keyword(s) is found instead of image data having metadata corresponding to the keyword(s).

In the processing described above with reference to FIG. 27, in particular, when the metadata update processing described with reference to FIG. 14 is executed and the metadata of the scrapbooks contain all metadata attached to images contained in the scrapbooks without overlapping metadata, only steps S181 and S184 may be executed. Similarly, in the processing described above with reference to FIG. 27, when information contained in the metadata of the scrapbooks is substantially the same as the contents of the metadata attached to the images contained in the scrapbooks, in other words, when the number of pieces of metadata attached to the metadata of the scrapbooks on the basis of the user's individual input is small, only the processing in steps S182 to S184 may be executed.

Although the control unit 20 automatically performs the processing for attaching metadata to the image data in the above-described description, the user may operate the operation unit 19 to select an image of the face of a certificate, note, stamp, ticket, coupon, or the like for the metadata addition processing.

Although the scrapbook has been described above as being created from the image data, the scrapbook may be created from scrapbooks.

The present invention is not limited to the HDD recorder, and is also applicable to any equipment (e.g., a personal computer) that is capable of recording or reproducing images and/or content.

The above-described series of processing can be executed by hardware or software. When the series of processing is executed by software, a program included in the software is installed from a program storage medium to, for example, a computer incorporated in dedicated hardware or to a general-purpose personal computer that is capable of executing various functions through installation of various programs.

Figure 28:
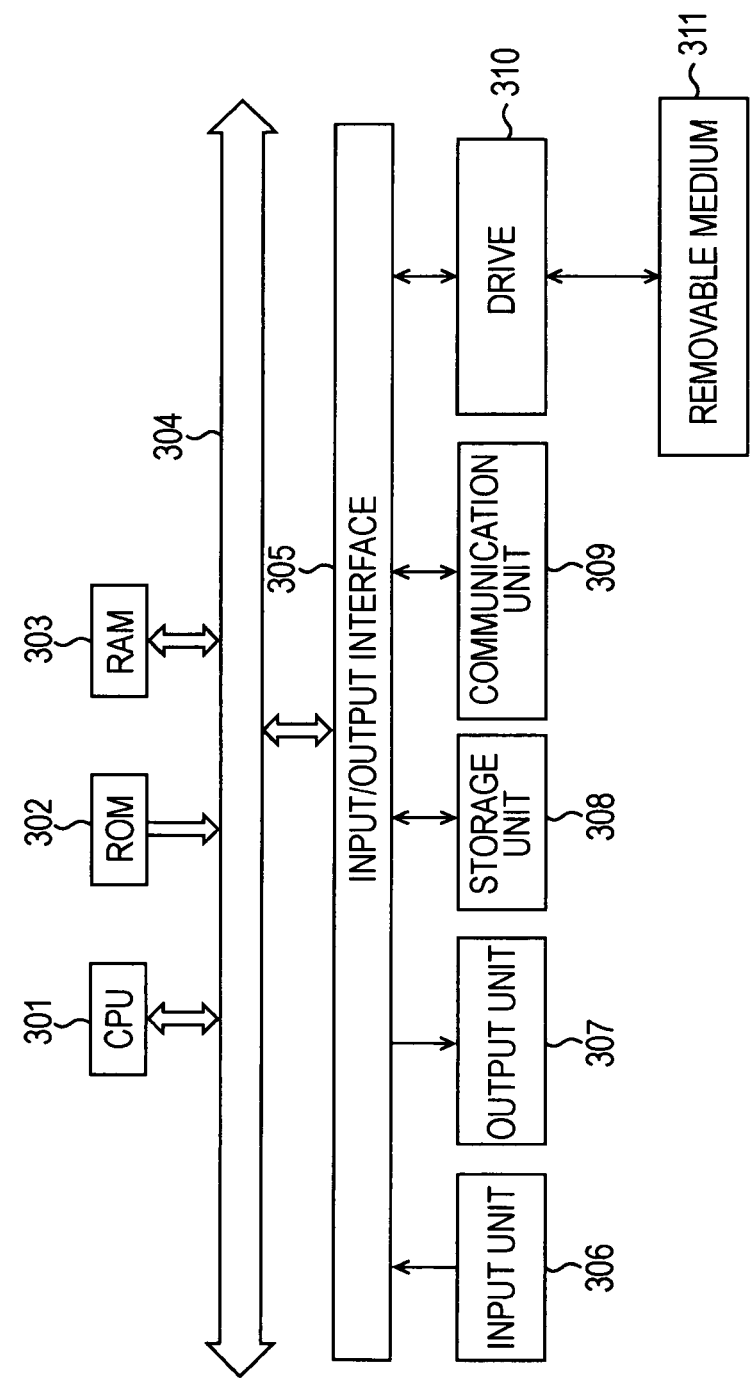
FIG. 28 is a block diagram showing an example of the configuration of a personal computer.

Examples of the program storage medium that stores the program that becomes executable by a computer through installation thereto include a removable medium 311 (which is a package medium), a ROM (not shown) that temporarily or permanently stores the program, and a hard disk included in a storage unit 308, as shown in FIG. 28. Examples of the removable medium 311 include a magnetic disk (including a flexible disk), an optical disk (including a CD-ROM [compact disk-read only memory], a DVD [digital versatile disc], and a magneto-optical disk), and a semiconductor memory.

The embodiment of the present invention is not limited to the above-described embodiment, and various changes can be made thereto without departing from the spirit and scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that displays, for each group, images that are divided into groups so that each group contains at least one of the images, the apparatus comprising:
   image-data storing means for storing image data representing the images;
   group-attribute-information storing means for storing group attribute information indicative of, for each one of the groups, a respective event and sub-event associated with that group;
   display controlling means for controlling processing for displaying the particular images associated with each group;
   search-key extracting means for extracting a search key based on a state at a time that the display controlling means issues an instruction for starting the processing for displaying the images for each group; and
   searching means for searching for respective groups associated with the search key extracted by the search-key extracting means by searching the group attribute information stored by the group-attribute-information storing means or synonyms associated with the group attribute information;
   wherein the display controlling means controls display of a library of the groups so that the respective groups associated with the search key and found by the searching means are displayed at topmost positions in the displayed library, and
   wherein when the display controlling means issues the instruction for starting the processing for displaying the particular images associated with each group, the search-key extracting means extracts, as the search key, (i) a currently popular keyword obtained from a number of rankings of search keywords from a number of Internet search engines, or (ii) a user keyword which matches a user's preference to information contained in an electronic program guide in a predetermined period of time.

2. The information processing apparatus according to claim 1, further comprising:
   electronic-program-guide obtaining means for obtaining the electronic program guide.

3. The information processing apparatus according to claim 1, further comprising:
   recording and/or reproducing means for recording and/or reproducing content data.

4. An information processing method for an information processing apparatus that displays, for each group, images that are divided into groups so that each group contains at least one of the images, the method comprising:
   storing image data representing the images;
   storing group attribute information indicative of, for each one of the groups, a respective event and sub-event associated with that group;
   extracting a search key based on a state at a time that an instruction for starting processing for displaying the images for each group is issued;
   searching for the groups associated with the extracted search key by searching the stored group attribute information or synonyms associated with the group attribute information; and
   controlling display of a library of the groups so that the respective groups associated with the search key are displayed at topmost positions in the displayed library, and
   wherein when the instruction for starting the processing for displaying the images for each group is issued, the extracting extracts, as the search key, (i) a currently popular keyword obtained from a number of rankings of search keywords from a number of Internet search engines, or (ii) a user keyword which matches a user's preference to information contained in an electronic program guide in a predetermined period of time.

5. A non-transitory storage medium that stores a program for carrying out an information processing method for an information processing apparatus that displays, for each group, images that are divided into groups so that each group contains at least one of the images, the method comprising:
   storing, in a first storing unit, image data representing images;
   storing, in a second storing unit, group attribute information indicative of, for each one of the groups, a respective event and sub-event associated with that group;
   extracting a search key based on a state at a time that an instruction for starting processing for displaying the images for each group is issued;

searching for the groups associated with the extracted search key by searching the stored group attribute information or synonyms associated with the group attribute information; and controlling display of a library of the groups so that the respective groups associated with the search key are displayed at topmost positions in the displayed library, and wherein when the instruction for starting the processing for displaying the images for each group is issued, the extracting extracts, as the search key, (i) a currently popular keyword obtained from a number of rankings of search keywords from a number of Internet search engines, or (ii) a user keyword which matches a user's preference to information contained in an electronic program guide in a predetermined period of time.

6. An information processing apparatus that displays, for each group, images that are divided into groups so that each group contains at least one of the images, the apparatus comprising:

image-data storing means for storing image data representing the images;

group-attribute-information storing means for storing group attribute information indicative of, for each one of the groups, a respective event and sub-event associated with that group;

display controlling means for controlling processing for displaying the particular images associated with each group;

search-key extracting means for extracting, in response to a user selecting one of the groups displayed by the display controlling means, the group attribute information respectively associated with the selected group as a search key from the group attribute information stored by the group-attribute-information storing means or synonyms associated with the group attribute information; and searching means for searching for the groups associated with the search key extracted by the search-key extracting means by searching the group attribute information stored by the group-attribute-information storing means;

wherein the display controlling means controls display of a library of the respective groups associated with the search key and found by the searching means, and wherein when the display controlling means issues the instruction for starting the processing for displaying the particular images associated with each group, the search-key extracting means extracts, as the search key, (i) a currently popular keyword obtained from a number of rankings of search keywords from a number of Internet search engines, or (ii) a user keyword which matches a user's preference to information contained in an electronic program guide in a predetermined period of time.

7. An information processing method for an information processing apparatus that displays, for each group, images that are divided into groups so that each group contains at least one of the images, the method comprising the steps of:

storing image data representing the images;

storing group attribute information indicative of, for each one of the groups, a respective event and sub-event associated with that group;

extracting, in response to a user selecting one of the displayed groups, the group attribute information respectively associated with the selected group as a search key from the stored group attribute information;

searching for the respective groups associated with the extracted search key by searching the stored group attribute information or synonyms associated with the group attribute information; and displaying a library of the found groups associated with the search key, wherein when the instruction for starting the processing for displaying the images for each group is issued, extracting extracts, as the search key, (i) a currently popular keyword obtained from a number of rankings of search keywords from a number of Internet search engines, or (ii) a user keyword which matches a user's preference to information contained in an electronic program guide in a predetermined period of time.

8. A non-transitory storage medium that stores a program for carrying out an information processing method for an information processing apparatus that displays for each group, images that are divided into groups so that each group contains at least one of the images, the method comprising:

storing, in a first storing unit, image data representing images;

storing, in a second storing unit, group attribute information indicative of, for each one of the groups, a respective event and sub-event associated with that group;

extracting, in response to a user selecting one of the displayed groups, the group attribute information respectively associated with the selected group as a search key from the stored group attribute information;

searching for the respective groups associated with the extracted search key by searching the stored group attribute information or synonyms associated with the group attribute information; and displaying a library of the found groups associated with the search key, and wherein when the instruction for starting the processing for displaying the images for each group is issued, the extracting extracts, as the search key, (i) a currently popular keyword obtained from a number of rankings of search keywords from a number of Internet search engines, or (ii) a user keyword which matches a user's preference to information contained in an electronic program guide in a predetermined period of time.

9. An information processing apparatus that displays, for each group, images that are divided into groups so that each group contains at least one of the images, the apparatus comprising:

an image-data storing unit configured to store image data representing the images;

a group-attribute-information storing unit configured to store group attribute information indicative of, for each one of the groups, a respective event and sub-event associated with that group;

a display controlling unit configured to control processing for displaying the particular images associated with each group;

a search-key extracting unit configured to extract a search key based on a state at a time that the display controlling unit issues an instruction for starting the processing for displaying the images for each group; and a searching unit configured to for respective groups associated with the search key extracted by the search-key extracting means by searching the group attribute information stored by the group-attribute-information storing unit or synonyms associated with the group attribute information;

wherein the display controlling unit controls display of a library of the groups so that the respective groups associated with the search key and found by the searching unit are displayed at topmost positions in the displayed library, and wherein when the display controlling means issues the instruction for starting the processing for displaying the particular images associated with each group, the search-key extracting means extracts, as the search key, (i) a currently popular keyword obtained from a number of rankings of search keywords from a number of Internet search engines, or (ii) a user keyword which matches a user's preference to information contained in an electronic program guide in a predetermined period of time.

10. The information processing apparatus according to claim 9, further comprising:

an electronic-program-guide obtaining unit configured to obtain the electronic program guide.

11. The information processing apparatus according to claim 9, further comprising:

a recording and/or reproducing unit configured to record and/or reproduce content data.

12. An information processing apparatus that displays, for each group, images that are divided into groups so that each group contains at least one of the images, the apparatus comprising:

an image-data storing unit configured to store image data representing the images;

a group-attribute-information storing unit configured to store group attribute information indicative of, for each one of the groups, a respective event and sub-event associated with that group;

a display controlling unit configured to control processing for displaying the particular images associated with each group;

a search-key extracting unit configured to extract, in response to a user selecting one of the groups displayed by the display controlling unit, the group attribute information respectively associated with the selected group as a search key from the group attribute information stored by the group-attribute-information storing unit; and a searching unit configured to search for the groups associated with the search key extracted by the search-key extracting unit by searching the group attribute information stored by the group-attribute-information storing unit or synonyms associated with the group attribute information;

wherein the display controlling unit controls display of a library of the respective groups associated with the search key and found by the searching unit, and wherein when the display controlling unit issues the instruction for starting the processing for displaying the particular images associated with each group, the search-key extracting unit extracts, as the search key, (i) a currently popular keyword obtained from a number of rankings of search keywords from a number of Internet search engines, or (ii) a user keyword which matches a user's preference to information contained in an electronic program guide in a predetermined period of time.

* * * * *